(12) United States Patent  (10) Patent No.: US 7,576,921 B2
Inoko                      (45) Date of Patent:    Aug. 18, 2009

(54) ZOOM LENS AND IMAGE PROJECTION APPARATUS

(75) Inventor: Kazuhiro Inoko, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/055,637

(22) Filed: Mar. 26, 2008

(65) Prior Publication Data

US 2008/0247049 A1 Oct. 9, 2008

(30) Foreign Application Priority Data

Apr. 6, 2007 (JP) ............................ 2007-100111

(51) Int. Cl.
*G02B 9/00* (2006.01)
*G02B 15/14* (2006.01)

(52) U.S. Cl. ...................... 359/649; 359/680

(58) Field of Classification Search ......... 359/649–651, 359/680–682
See application file for complete search history.

(56) References Cited

U.S. PATENT DOCUMENTS

| 4,124,274 | A  |   | 11/1978 | Tanaka et al. |         |
|-----------|----|---|---------|---------------|---------|
| 5,831,776 | A  | * | 11/1998 | Sasaya et al. | 359/754 |
| 6,580,564 | B2 |   | 6/2003  | Nagahara      |         |
| 6,686,988 | B1 |   | 2/2004  | Sugawara      |         |
| 7,190,528 | B2 |   | 3/2007  | Inoko         |         |
| 2002/0181120 | A1 | | 12/2002 | Nagahara      |         |
| 2006/0187556 | A1 | | 8/2006  | Inoko         |         |
| 2007/0030576 | A1 | | 2/2007  | Arai et al.   |         |

FOREIGN PATENT DOCUMENTS

| JP | 3263835 B2    | 10/1995 |
|----|---------------|---------|
| JP | 10-186235 A   | 7/1998  |
| JP | 2001-124991 A | 5/2001  |
| JP | 2002-357771 A | 12/2002 |
| JP | 2006-234893 A | 9/2006  |

OTHER PUBLICATIONS

Translation of JP 10-186235.
Communication from EPO dated Aug. 19, 2008 including European Search Report dated Aug. 1, 2008.

* cited by examiner

*Primary Examiner*—William C Choi
(74) *Attorney, Agent, or Firm*—Canon USA Inc IP Div

(57) ABSTRACT

The zoom lens includes a plurality of lens units. The first lens unit is disposed closest to a magnification side in the plurality of lens units and has a negative optical power, and magnification-varying lens units that are disposed closer to a reduction side than the first lens unit and moves for variation of magnification. The first lens unit includes, in order from the magnification side, a first-A lens sub-unit having a negative optical power and a first-B lens sub-unit having a positive optical power. For focusing from an infinite side to a close side, the first-A and first-B lens sub-units move as a distance therebetween increases, and the first-B lens sub-unit moves toward the reduction side. The zoom lens is capable of correcting well variation of curvature of field due to a projection distance change and has a good optical performance.

8 Claims, 20 Drawing Sheets

ZOOM LENS AND IMAGE PROJECTION APPARATUS

BACKGROUND OF THE INVENTION

The present invention relates to a zoom lens suitable for, for example, a projection lens used in an image projection apparatus (projector).

Projectors require that a change in projection distance does not cause a significant change in quality of a projected image, that is, causes only small variation in performance of a projection lens.

Further, in the projector, color light components emerging from image-forming elements such as liquid crystal panels for R, G, and B are combined by a color-combining optical system to be introduced to the projection lens, so that the projection lens needs to have a long back focus. Therefore, the projection lens often employs a so-called retrofocus type lens configuration in which a strong negative refractive power is disposed closer to a projection surface (screen) than an aperture stop.

However, the retrofocus type lens has a feature that curvature of field due to the projection distance change is easily caused mainly by asymmetry of the lens, and therefore it is difficult to suppress the variation in performance of the projection lens due to the projection distance change. Moreover, an increase of a field angle of the retrofocus type lens for shortening the projection distance makes the curvature of field more obvious. Further, an image-forming element with high resolution decreases a permissive range of the curvature of field due to the projection distance change.

A method called as floating has been conventionally used for reducing the curvature of field due to the projection distance change. In the floating, plural lens units are simultaneously moved so as to mutually correct aberrations such as the curvature of field generated in the respective lens units. In particular, a lens configuration, in which a first lens unit that is disposed closest to a magnification side and does not contribute to variation of magnification is divided into two lens sub-units to perform the floating, has a merit that no variation of focus position is caused by the variation of magnification.

Such floating performed using the first lens unit divided into two lens sub-units has been disclosed in, for example, Japanese Patent Laid-Open No. 2002-35771 (corresponding to U.S. Pat. No. 6,580,564).

In addition, a so-called inner focus type zoom lens has been disclosed in Japanese Patent No. 3263835 and Japanese Patent Laid-Open No. 2001-124991 (corresponding to U.S. Pat. No. 6,686,988) in which a most-magnification side lens sub-unit is fixed and a reduction side lens sub-unit disposed next to the most-magnification side lens sub-unit on a reduction side is moved for focusing, which, however, is hard to be classified as the floating. In the inner focus type zoom lens, the most-magnification side lens sub-unit has a negative refractive power and the reduction side lens sub-unit moved for focusing has a positive refractive power.

Further, a zoom lens has been disclosed in Japanese Patent Laid-Open No. 2006-234893 (corresponding to U.S. Pat. No. 7,190,528) in which a lens sub-unit having a negative refractive power and being disposed closer to the magnification side than a fixed lens sub-unit having a positive refractive power is moved for focusing.

The zoom lens disclosed in Japanese Patent Laid-Open No. 2002-35771 has a negative refractive power as a whole, and therein the floating is performed by dividing the first lens unit that is unmoved for the variation of magnification into a first-A lens sub-unit and a first-B lens sub-unit respectively having a negative refractive power. However, the floating in a negative-negative type zoom lens is not suitable for miniaturization thereof because a lens movement amount is increased compared to a case where the focusing is performed by moving the entire first lens unit.

The zoom lens disclosed in Japanese Patent No. 3263835 does not have a sufficient effect to correct variation of an image plane because a ratio of the refractive power of the first-B lens sub-unit to that of the entire first lens unit is large. In addition, the zoom lens disclosed therein is not suitable for a projection lens that needs to be telecentric on the reduction side because a most-reduction side lens unit thereof has a negative refractive power.

The zoom lens disclosed in Japanese Patent Laid-Open No. 2001-124991 has an extremely small effective image circle, is insusceptible to the curvature of field, and includes the first-B lens sub-unit having an extremely small refractive power. Thus, the zoom lens is a zoom lens having an object different from that of the present invention.

The zoom lens disclosed in Japanese Patent Laid-Open No. 2006-234893 improves the curvature of field to some extent compared to the case where the entire first lens unit is moved. However, it cannot provide a sufficient effect to remove the variation of the curvature of field.

BRIEF SUMMARY OF THE INVENTION

The present invention provides a zoom lens that is capable of correcting well the variation of the curvature of field due to the projection distance change in a wide projection distance range from a close distance to an infinite distance and has a good optical performance.

According to an aspect, the present invention provides a zoom lens including a plurality of lens units. The zoom lens includes a first lens unit that is disposed closest to a magnification side in the plurality of lens units and has a negative optical power, and a magnification-varying lens unit that is disposed closer to a reduction side than the first lens unit and moves for variation of magnification. The first lens unit includes, in order from the magnification side, a first-A lens sub-unit having a negative optical power and a first-B lens sub-unit having a positive optical power. For focusing from an infinite side to a close side, the first-A and first-B lens sub-units move as a distance therebetween increases, and the first-B lens sub-unit moves toward the reduction side.

According to another aspect, the present invention provides a zoom lens including a plurality of lens units. The zoom lens includes a first lens unit that is disposed closest to a magnification side in the plurality of lens units and has a negative optical power, and a magnification-varying lens unit that is disposed closer to a reduction side than the first lens unit and moves for variation of magnification. The first lens unit includes, in order from the magnification side, a first-A lens sub-unit having a negative optical power and a first-B lens sub-unit having a positive optical power. The first-A lens sub-unit is unmoved for focusing, and the first-B lens sub-unit is moved toward the reduction side for focusing from an infinite side to a close side. The following condition is satisfied:

$$-2000 < f_{1B}/f_1 < -1.0$$

where $f_{1B}$ represents a focal length of the first-B lens sub-unit, and $f_1$ represents a focal length of the entire first lens unit.

According to still another aspect, the present invention provides an image projection apparatus that includes an image-forming element that forms an image, and the above-described zoom lens that projects light from the image-forming element onto a projection surface.

Other aspects of the present invention will become apparent from the following description and the attached drawings.

DETAILED DESCRIPTION OF EMBODIMENTS

Exemplary embodiments of the present invention will hereinafter be described with reference to the accompanying drawings.

Embodiment 1

Figure 20:
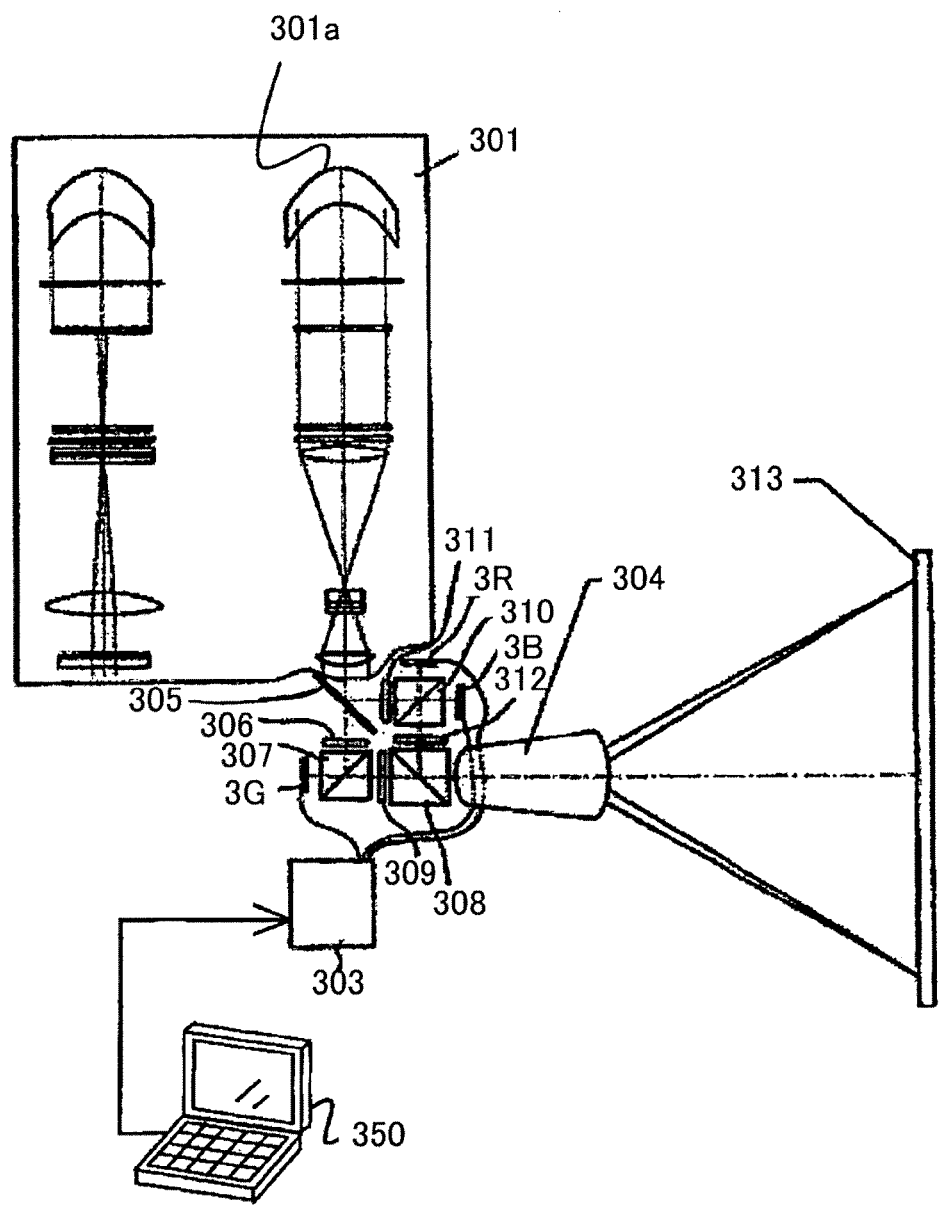
FIG. 20 shows a configuration of a projector provided with the zoom lens of each of the embodiments.

FIG. 20 shows the configuration of an image projection apparatus (projector) that is a first embodiment (Embodiment 1) of the present invention and provided with a zoom lens serving as a projection lens.

In FIG. 20, reference numeral 303 denotes a liquid crystal driver. The liquid crystal driver 303 receives a video signal from an image supply apparatus 350 such as a personal computer, a DVD player, and a television tuner. The liquid crystal driver 303 converts the video signal into driving signals for a red (R) liquid crystal display element 3R, a green (G) liquid crystal display element 3G, and a blue (B) liquid crystal display element 3B, all of which are reflective liquid crystal display elements serving as image-forming elements. Thus, the red liquid crystal display element 3R, the green liquid crystal display element 3G, and the blue liquid crystal display element 3B are individually controlled. The projector and the image supply apparatus 350 constitute an image display system.

Reference numeral 301 denotes an illumination optical system. Shown on the left in a box in FIG. 20 is a side view of the illumination optical system 301 shown on the right. The illumination optical system 301 converts white light emitted from a light source lamp 301a such as a high-pressure mercury lamp into linearly polarized light having a polarization direction perpendicular to the sheet of FIG. 20 and introduces the polarized light to a dichroic mirror 305.

The dichroic mirror 305 in this embodiment reflects a light component in magenta and transmits a light component in green. The magenta light component in the white light is deflected to be introduced to a blue cross color polarizer 311.

The blue cross color polarizer 311 provides retardation of one-half wavelength for polarized light in blue. This produces a blue light component that is linearly polarized light having a polarization direction in parallel with the sheet of FIG. 20 and a red light component that is linearly polarized light having a polarization direction perpendicular to the sheet of FIG. 20.

Next, the blue light component enters a first polarization beam splitter 310 as P-polarized light and then is transmitted through its polarization splitting film to be introduced to the liquid crystal display element 3B for blue. The red light component enters the first polarization beam splitter 310 as S-polarized light and then is reflected by the polarization splitting film to be introduced to the liquid crystal display element 3R for red.

On the other hand, after the transmission through the dichroic mirror 305, the green light component passes through a dummy glass 306 for correcting an optical path length of the green light component and then enters a second polarization beam splitter 307. The green light component having the polarization direction perpendicular to the sheet of FIG. 20 is S-polarized light for a polarization splitting film of the second polarization beam splitter 307, so that the green light component is reflected thereby to be introduced to the liquid crystal display element 3G for green.

In this manner, the illumination light components enter the red liquid crystal display element 3R, the green liquid crystal display element 3G, and the blue liquid crystal display element 3B.

Each of the liquid crystal display elements provides retardation for the entering illumination light (polarized light) in accordance with the modulation state of pixels arranged on the liquid crystal display element. Of reflected light from each liquid crystal display element, the light component polarized in the same direction as that of the illumination light is generally returned along the optical path of the illumination light toward the light source lamp 301a.

Of the reflected light from each liquid crystal display element, image light formed of the light component polarized in the direction perpendicular to the polarization direction of the illumination light travels in the following manner.

The red light component that is linearly polarized light having the polarization direction in parallel with the sheet of FIG. 20 emerges from the red liquid crystal display element 3R, is transmitted through the polarization splitting film of the first polarization beam splitter 310 as P-polarized light, and then is transmitted through a red cross color polarizer 312.

The red cross color polarizer 312 provides retardation of one-half wavelength for the red light component. This converts the red light component into linearly polarized light having the polarization direction perpendicular to the sheet of FIG. 20.

Then, the red light component enters a third polarization beam splitter 308 as S-polarized light and then is reflected by its polarization splitting film toward a projection lens (projection optical system) 304.

The blue light component that is linearly polarized light having the polarization direction perpendicular to the sheet of FIG. 20 emerges from the blue liquid crystal display element 3B, is reflected by the polarization splitting film of the first polarization beam splitter 310 as S-polarized light, and then is transmitted through the red cross color polarizer 312 without any change. The blue light component enters the third polarization beam splitter 308 as S-polarized light and then is reflected by the polarization splitting film toward the projection lens 304.

The green light component that is linearly polarized light having the polarization direction in parallel with the sheet of FIG. 20 emerges from the green liquid crystal display element 3G, is transmitted through the polarization splitting film of the second polarization beam splitter 307, and then is transmitted through a dummy glass 309 for correcting the optical path length thereof. The blue light component enters the third polarization beam splitter 308 as P-polarized light and then is transmitted through the polarization splitting film to be introduced to the projection lens 304.

After the color combination in the third polarization beam splitter 308, the red, green, and blue light components are taken by an entrance pupil of the projection lens 304 to be transferred to a light diffusion screen (projection surface) 313. The light modulation surfaces of the respective liquid crystal display elements and the optical diffusion surface of the screen 313 are placed in an optically conjugate relationship by the projection lens 304. Therefore, an image based on the video signal is projected (displayed) on the screen 313.

The red liquid crystal display element 3R, the green liquid crystal display element 3G, and the blue liquid crystal display element 3B are adjusted such that the light components from the associated pixels overlap each other on the screen 313 with predetermined accuracy.

Figure 1:
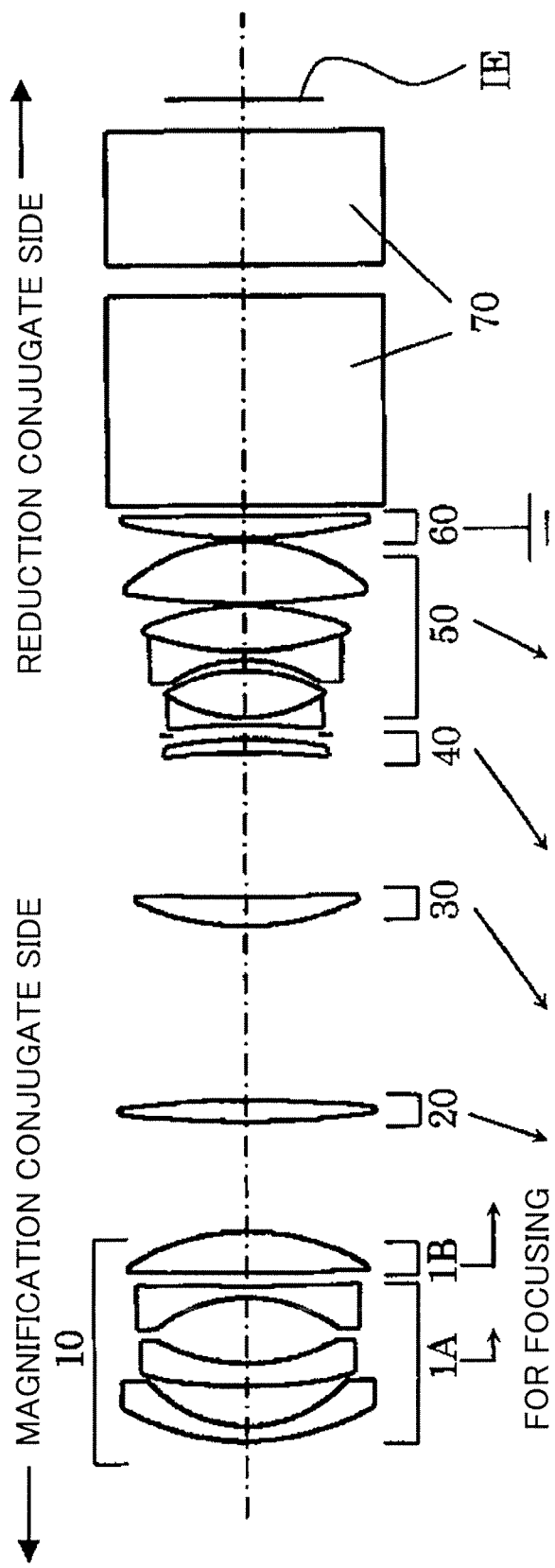
FIG. 1 is a sectional view showing a zoom lens that is a first embodiment (Embodiment 1) of the present invention at a wide-angle end.

Next, description will be made of the projection lens (zoom lens) of this embodiment with reference to FIG. 1. FIG. 1 shows an optical section of the zoom lens at a wide-angle end.

The zoom lens of this embodiment is constituted by six lens units 10, 20, 30, 40, 50, and 60 including thirteen lens elements. Reference numeral 70 denotes the above-described polarization beam splitter, and reference character IE denotes the above-described liquid crystal display element.

The six lens units 10 to 60 have, in order from a magnification conjugate side (also merely referred to as a magnification side) to a reduction conjugate side (also merely referred to as a reduction side), negative, positive, positive, positive, negative, and positive refractive powers. The refractive power can also be said as the optical power that is represented by an inverse of a focal length of the lens unit. In this embodiment, each lens unit is constituted by one or plurality of lens elements and may include other optical element than the lens element, such as a diffractive optical element attached to a lens surface.

Of the thirteen lens elements, the second and seventh lens elements counted from the magnification side respectively have aspheric surfaces on their both sides. For variation of magnification (hereinafter referred to as zooming), the second, third, fourth, and fifth lens units 20 to 50 are moved in an optical axis direction, and the first and sixth lens units 10 and 60 are fixed (unmoved). In other words, the first and sixth lens units 10 and 60 do not contribute to the variation of magnification, and the second, third, fourth, and fifth lens units 20 to 50 are magnification-varying lens units.

The first lens unit 10 includes a first-A lens sub-unit (shown by reference character 1A in the figure) and a first-B lens sub-unit (shown by reference character 1B in the figure). The first-A lens sub-unit is disposed closer to the magnification conjugate side than the first-B lens sub-unit and has a negative refractive power, and the first-B lens sub-unit is disposed closer to the reduction conjugate side than the first-A lens sub-unit and has a positive refractive power. For focusing from an infinite side (far side) to a close side (near side), the first-A and first-B lens sub-units are moved toward the reduction conjugate side as a distance therebetween is increased.

Here, description will be made of motions of the first-A and first-B lens sub-units in negative-positive floating for focusing in this embodiment with reference to FIGS. 19A and 19B.

Figure 19A:
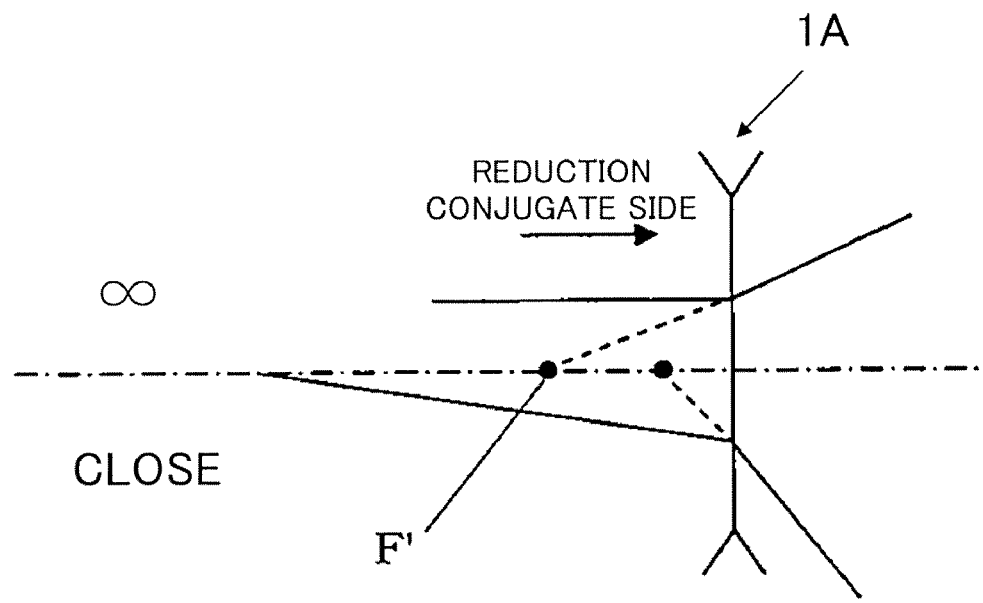
FIG. 19A.

FIG. 19A shows movement of the reduction side conjugate point (reduction conjugate side principal point) F' due to the motion of the entire first lens unit associated with change of a magnification conjugate side distance. When the magnification conjugate side distance is changed from the infinite side (far side) to the close side (near side), the reduction side conjugate point F' is moved therewith toward the reduction conjugate side. In a precise sense, the change of the distance between the first-A lens sub-unit and the first-B lens sub-unit varies a synthesized focal length of the entire first lens unit.

However, the change amount of the distance between the first-A and first-B lens sub-units is sufficiently smaller than the change amount of the magnification conjugate side distance, so that it hardly influences the movement direction and movement amount of the reduction side conjugate point F'.

Figure 19B:
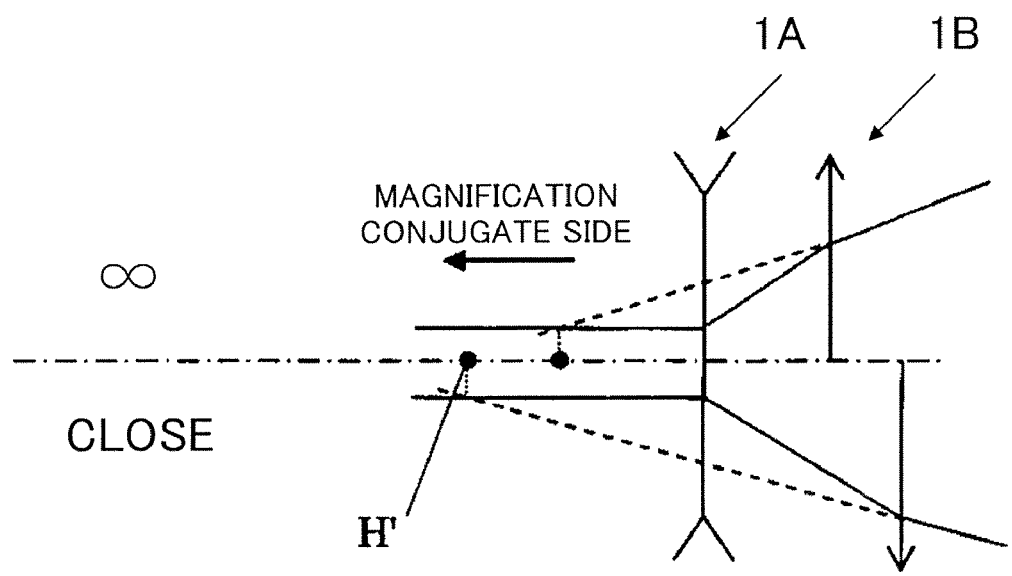
FIG. 19B are explanatory diagrams showing motions of lens units for focusing in each of the embodiments.

On the other hand, FIG. 19B shows movement of the reduction side conjugate point H' due to the change of the distance between the first-A lens sub-unit and the first-B lens sub-unit. The motion of the first-B lens sub-unit toward the reduction conjugate side produces curvature of field in an under direction.

Therefore, in focusing from the infinite side to the close side which generates curvature of field in an over direction, the first-B lens sub-unit is moved away from the first-A lens sub-unit. When the distance between the first-A lens sub-unit and the first-B lens sub-unit is increased, the reduction side conjugate point H' of the entire first lens unit is moved toward the magnification conjugate side.

The movement amount of the reduction side conjugate point H' shown in FIG. 19B is larger than that of the reduction side conjugate point F' shown in FIG. 19A. Therefore, in focusing from the infinite side to the close side, the first-B lens sub-unit is inevitably moved (retracted) toward the reduction conjugate side. The motion of the first-A lens sub-unit can be arbitrarily adjusted by changing the refractive power of the first-B lens sub-unit.

In the case where the first-A lens sub-unit and the first-B lens sub-unit are both moved as described in this embodiment, the refractive power of the first-B lens sub-unit basically has no limitation. However, from a standpoint of well-balanced aberration correction, it is preferable to satisfy at least one of the following conditions (1) to (4):

$$-2000 < f_{1B}/f_1 < -1.0 \quad (1)$$

$$-30 < SF < -0.2 \quad (2)$$

$$-0.7 < f_{1A}/f_{1B} < -0.02 \quad (3)$$

$$0.1 < |f_w/bf| < 0.8 \quad (4)$$

where $f_{1A}$ represents a focal length of the first-A lens sub-unit, $f_{1B}$ a focal length of the first-B lens sub-unit, and $f_1$ a focal length of the entire first lens unit. SF is defined as $SF=(RR+RF)/(RR-RF)$ when RR and RF respectively represent curvature radii of a most-reduction side lens surface and a most-magnification side lens surface of the first-B lens sub-unit. $f_w$ represents a focal length of the entire zoom lens at the wide-angle end, and bf a back focus in air from a most-reduction side lens surface in the zoom lens to a reduction-side conjugate plane of the zoom lens.

In a case where the refractive power of the first-B lens sub-unit is set such that the movement amount of the reduction side conjugate point shown in FIG. 19A is equal to that shown in FIG. 19B, the first-A lens sub-unit can be fixed (unmoved) for focusing. In this case, to perform focusing while correcting the curvature of field, it is preferable that the refractive power of the first-B lens sub-unit, in other words, a ratio of the refractive power of the first-B lens sub-unit to that of the entire first lens unit satisfy the condition (1).

If the ratio is larger than the lower limit of the condition (1), focusing can be performed while preventing variation of the curvature of field from being insufficiently corrected due to lack of the curvature of field in the under direction. If the ratio is smaller than the upper limit of the condition (1), focusing can be performed while preventing the movement amount of the first-B lens sub-unit from being increased and while preventing the variation of the curvature of field from being magnified due to generation of the curvature of field in the over direction.

The condition (2) represents desirable shapes of the lens surfaces of the first-B lens sub-unit. The value of SF larger than the lower limit of the condition (2) makes it possible to sufficiently ensure the amount of the curvature of field generated in the under direction for correction of the curvature of field. The value of SF smaller than the upper limit of the condition (2) makes it possible to prevent the correction from being excessive.

The condition (3) represents a ratio of the refractive power of the first-A lens sub-unit to that of the first-B lens sub-unit. Satisfying the condition (3) can realize focusing by the negative-positive floating while achieving a long back focus and well-balanced aberration correction.

The condition (4) relates to the back focus of the zoom lens. If the absolute value of $f_w/bf$ satisfies the condition (4), an adequate back focus for projectors can be obtained.

Instead of satisfying the conditions (1) to (4), it is more preferable to satisfy at least one of the following conditions (1') to (4'):

$$-30 < f_{1B}/f_1 < -1.5 \quad (1')$$

$$-20 < SF < -0.6 \quad (2')$$

$$-0.4 < f_{1A}/f_{1B} < -0.04 \quad (3')$$

$$0.2 < |f_w/bf| < 0.6 \quad (4')$$

Further, it is still more preferable to satisfy the following conditions (5) and (6) in addition to the above-described conditions.

(5) It is desirable that a most-reduction side lens unit in the zoom lens (sixth lens unit 60 in this embodiment) have a positive refractive power and be fixed (unmoved) for focusing. The projection lens for projectors needs to be telecentric on the reduction conjugate side as well as image-pickup lenses for image-pickup apparatuses using an image-pickup element such as a CCD sensor and a CMOS sensor. The most-reduction side lens unit having a positive refractive power is advantageous to such a projection lens.

(6) To correct the curvature of field, it is preferable that a most-reduction side lens surface of the first-B lens sub-unit be a convex surface toward the reduction conjugate side because the convex lens surface generates the curvature of field in the under direction. In particular, when the most-reduction side lens surface and the most-magnification side lens surface of the first-B lens sub-unit are convex surfaces toward the reduction conjugate side, a correction effect for the curvature of field can be increased because each lens surfaces can correct the curvature of field. In this case, the first-B lens sub-unit constituted by one meniscus lens element whose both side surfaces are convex toward the reduction conjugate side enables provision of a high effect for correcting the curvature of field and simplification of the lens configuration.

Note that the above-described conditions (1) to (6) are not indispensable ones for embodiments of the present invention but ones to obtain preferable effects. In other words, it is preferable to satisfy at least one of the conditions (1) to (6), and more preferably, all of them.

Table 1 shows a numerical example of this embodiment. f represents the focal length (mm) of the zoom lens, ω a half field angle, and F an F-number. Surface numbers in Table 1 represent numbers assigned to the lens surfaces in order from the screen side (magnification conjugate side). r represents a curvature radius of each lens surface, and d a distance (physical distance) (mm) between the lens surfaces adjacent to each other. $n_d$ and $v_d$ respectively represent a refractive index and an Abbe number for d-line of glass material forming the lens elements.

The distance between the lens surfaces marked with z in Table 1 is changed with zooming or focusing, and the values thereof at W (wide-angle end), M (middle position), and T (telephoto end) are shown in Table 1. The lens surface whose number is marked with * on its right side has an aspheric shape defined by the following function, and aspheric coefficients are shown in Table 1. y represents a coordinate in a lens diameter direction, and x a coordinate in the optical axis direction. "e±X" represents "X10^{±X}".

$$x = (y^2/r)/[1+\{1-(1+K)(y^2/r^2)\}^{1/2}] + Ay^4 + By^6 + Cy^8 + Dy^{10} + Ey^{12}$$

The above notations of the lens specifications are also used in other embodiments (numerical examples), which will be described below.

Figure 2:
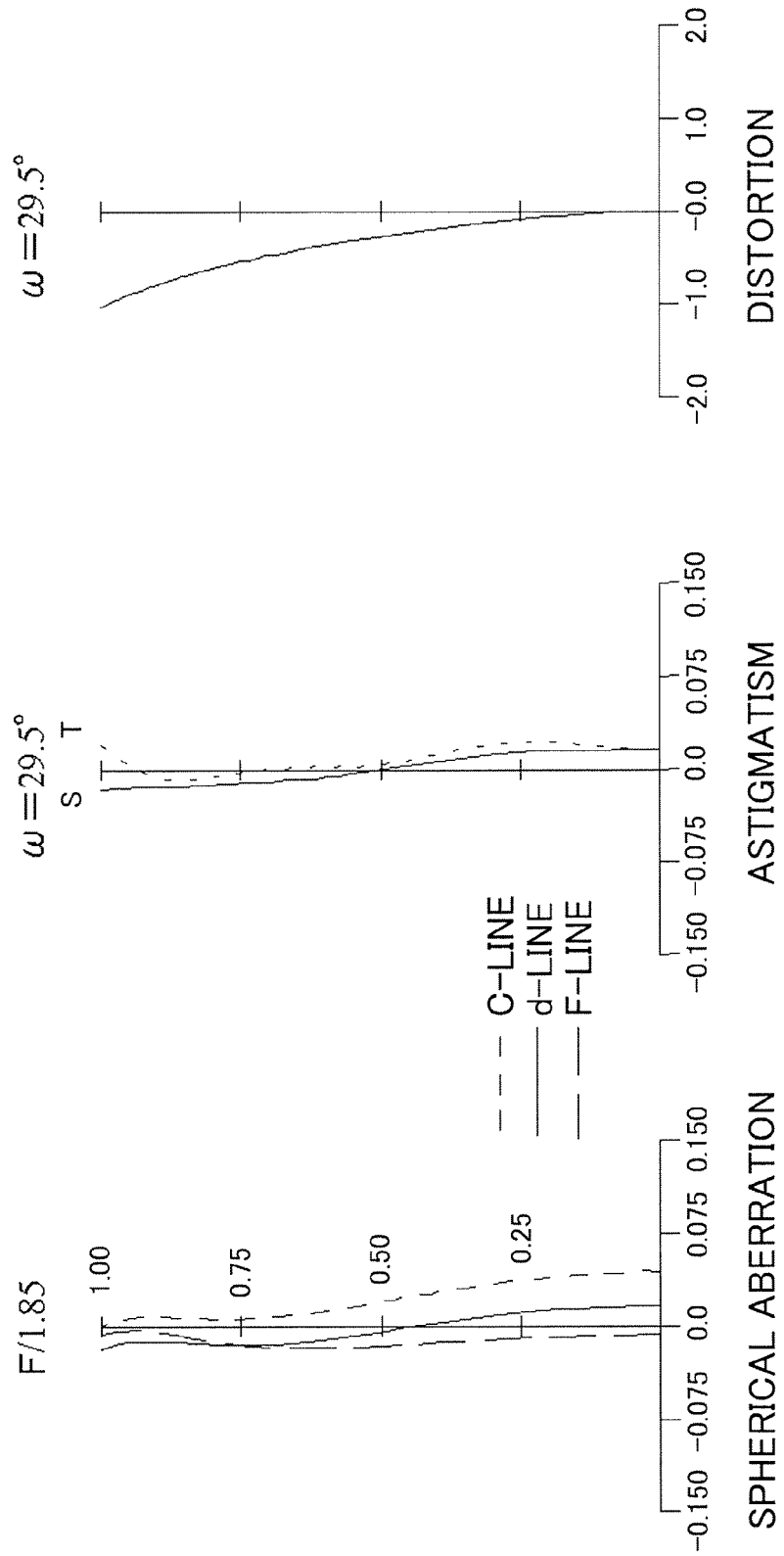
FIG. 2 shows aberrations of the zoom lens of Embodiment 1 (numerical example) at the wide-angle end.
Figure 3:
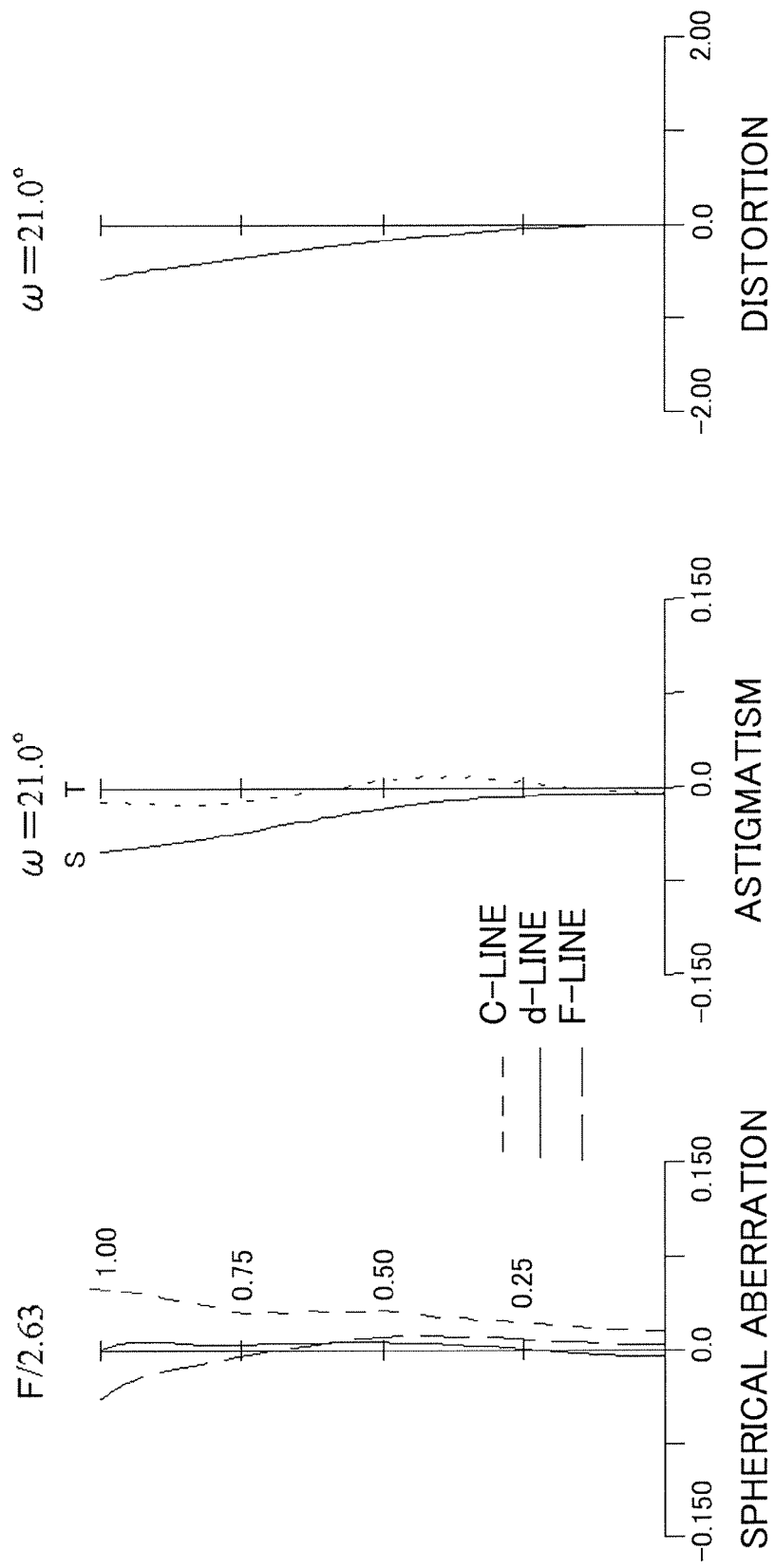
FIG. 3 shows aberrations of the zoom lens of Embodiment 1 (numerical example) at a telephoto end.

FIGS. 2 and 3 respectively show aberrations (spherical aberration, astigmatism, and distortion) of the zoom lens in this numerical example at the wide-angle end and at the telephoto end, the projection distance being 2.1 m.

TABLE 1

$f = 21.79\text{-}31.90 \quad \omega = 29.5°\text{-}21.0° \quad F/1.85\text{-}F/2.63$
$f_{1B}/f_1 = -1.642$
$SF = -0.848$
$f_{1A}/f_{1B} = -0.279$
$|f_w/bf| = 0.48$

|  | r | d | $n_d$ | $v_d$ |
|---|---|---|---|---|
| OBJ | 0.000 | 2100.00z | | |
| 1 | 39.281 | 2.32 | 1.805 | 25.4 |
| 2 | 20.390 | 6.31 | | |
| 3* | 173.744 | 3.60 | 1.529 | 55.8 |
| 4* | 30.994 | 10.35 | | |
| 5 | −22.720 | 1.90 | 1.487 | 70.2 |
| 6 | 590.397 | 2.00z | | |
| 7 | 431.325 | 6.38 | 1.612 | 37.0 |
| 8 | −35.434 | 17.25z | | |
| 9 | 152.532 | 3.37 | 1.834 | 37.1 |
| 10 | −170.845 | 27.18z | | |
| 11 | 40.304 | 4.69 | 1.516 | 64.1 |
| 12 | 804.656 | 22.66z | | |
| 13* | −137.453 | 2.17 | 1.583 | 59.3 |
| 14* | −67.225 | 0.50 | | |
| 15 | 0.000 | 1.74z | | |
| 16 | −82.657 | 1.10 | 1.834 | 37.1 |
| 17 | 22.600 | 7.44 | 1.496 | 81.5 |
| 18 | −24.365 | 1.67 | | |
| 19 | −20.490 | 1.40 | 1.834 | 37.1 |
| 20 | 47.510 | 6.98 | 1.622 | 58.1 |
| 21 | −39.760 | 0.50 | | |
| 22 | 114.757 | 9.53 | 1.487 | 70.2 |
| 23 | −28.901 | 0.50z | | |
| 24 | 79.636 | 3.46 | 1.805 | 25.4 |
| 25 | 12542.577 | 1.50 | | |
| 26 | 0.000 | 32.76 | 1.516 | 64.1 |
| 27 | 0.000 | 5.00 | | |
| 28 | 0.000 | 21.00 | 1.672 | 32.2 |
| 29 | 0.000 | | | |

|  | K | A | B | C | D | E |
|---|---|---|---|---|---|---|
| 3 | 0.000e+000 | 2.967e−005 | −9.811e−008 | 3.034e−010 | −4.865e−013 | 2.697e−016 |
| 4 | −1.279e+000 | 2.582e−005 | −1.149e−007 | 3.036e−010 | −4.480e−013 | −2.078e−016 |
| 13 | 0.000e+000 | −3.879e−006 | 5.625e−009 | −4.265e−011 | 6.893e−013 | −1.596e−015 |
| 14 | 0.000e+000 | −2.145e−006 | 5.690e−009 | −3.216e−011 | 7.085e−013 | −1.806e−015 |

|  | W | M | T |
|---|---|---|---|
| d6 | 2.00 | 2.00 | 2.00 |
| d8 | 17.25 | 5.79 | 0.32 |
| d10 | 27.18 | 26.08 | 16.49 |
| d12 | 22.66 | 16.18 | 17.47 |
| d15 | 1.74 | 11.65 | 14.90 |
| d23 | 0.50 | 9.63 | 20.16 |

|  | W close | W ∞ | T close | T ∞ |
|---|---|---|---|---|
| d0 | 1200.00 | 8700.00 | 1200.00 | 8700.00 |
| d6 | 2.20 | 1.80 | 2.20 | 1.80 |
| d8 | 16.67 | 17.83 | −0.25 | 0.90 |

Embodiment 2

Figure 4:
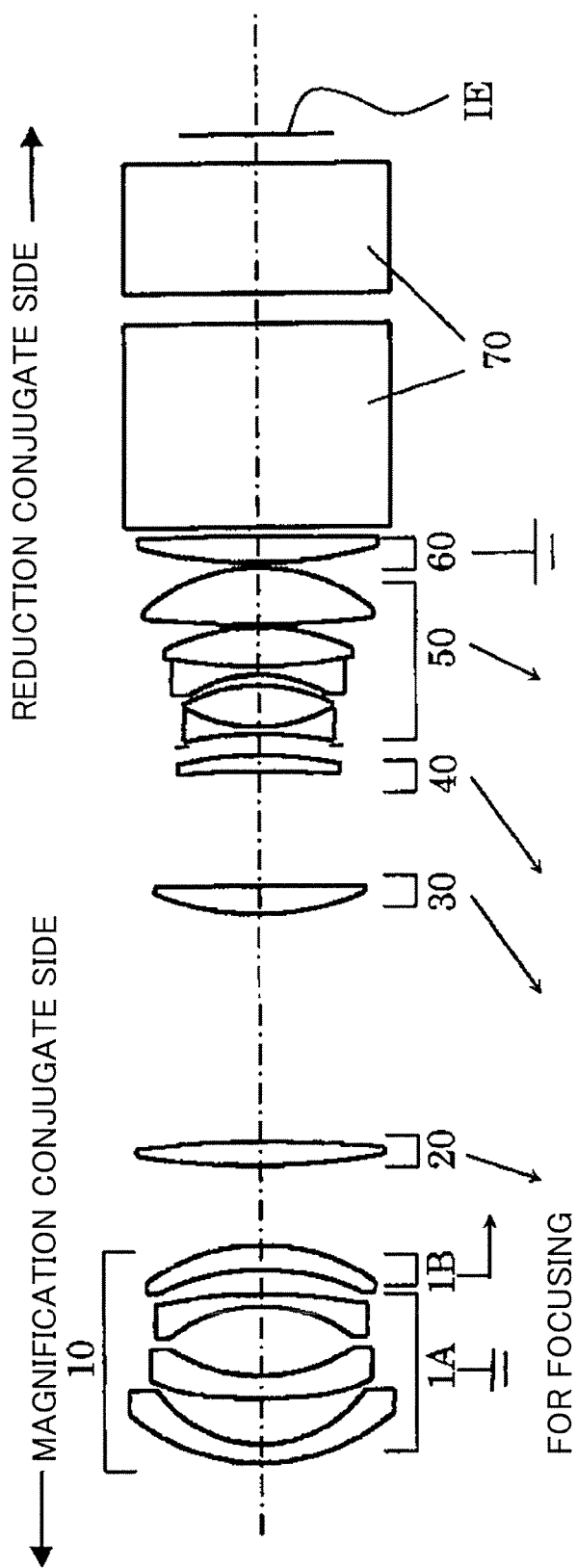
FIG. 4 is a sectional view showing a zoom lens that is a second embodiment (Embodiment 2) of the present invention at a wide-angle end.

FIG. 4 shows an optical section of a zoom lens (projection lens) that is a second embodiment (Embodiment 2) of the present invention at a wide-angle end.

The lens configuration of this embodiment is basically identical to that in Embodiment 1. However, the refractive power of the first-B lens sub-unit is significantly different from that in Embodiment 1, which provides the movement amount of the image side principal point and the movement of the image point that are well-balanced to each other and therefore fixes (does not move) the first-A lens sub-unit for focusing.

This results in focusing performed by moving only the first-B lens sub-unit, and therefore the configuration of a lens barrel housing and driving the zoom lens can be made simpler than in Embodiment 1.

Further, the first-B lens sub-unit has an extremely small decentration sensitivity. Thus, productivity of the zoom lens can be improved compared to a case where the first-A and first-B lens sub-units are both moved for focusing and a case where the entire first lens unit is moved for focusing.

However, in the case where the first-A lens sub-unit is fixed as described in this embodiment, it is necessary that the refractive power of the first-B lens sub-unit, in other words, the ratio of the refractive power of the first-B lens sub-unit to that of the entire first lens unit satisfy the condition (1). Further, it is preferable to satisfy at least one of the conditions (2) to (4) for the reasons described in Embodiment 1.

Instead of satisfying the conditions (1) to (4), it is more preferable to satisfy at least one of the following conditions (1") and (2') to (4'):

$$-30 < f_{1B}/f_1 < -1.2 \quad (1'')$$

$$-20 < SF < -0.6 \quad (2')$$

$$-0.4 < f_{1A}/f_{1B} < -0.04 \quad (3')$$

$$0.2 < |f_w/bf| < 0.6 \quad (4')$$

Figure 5:
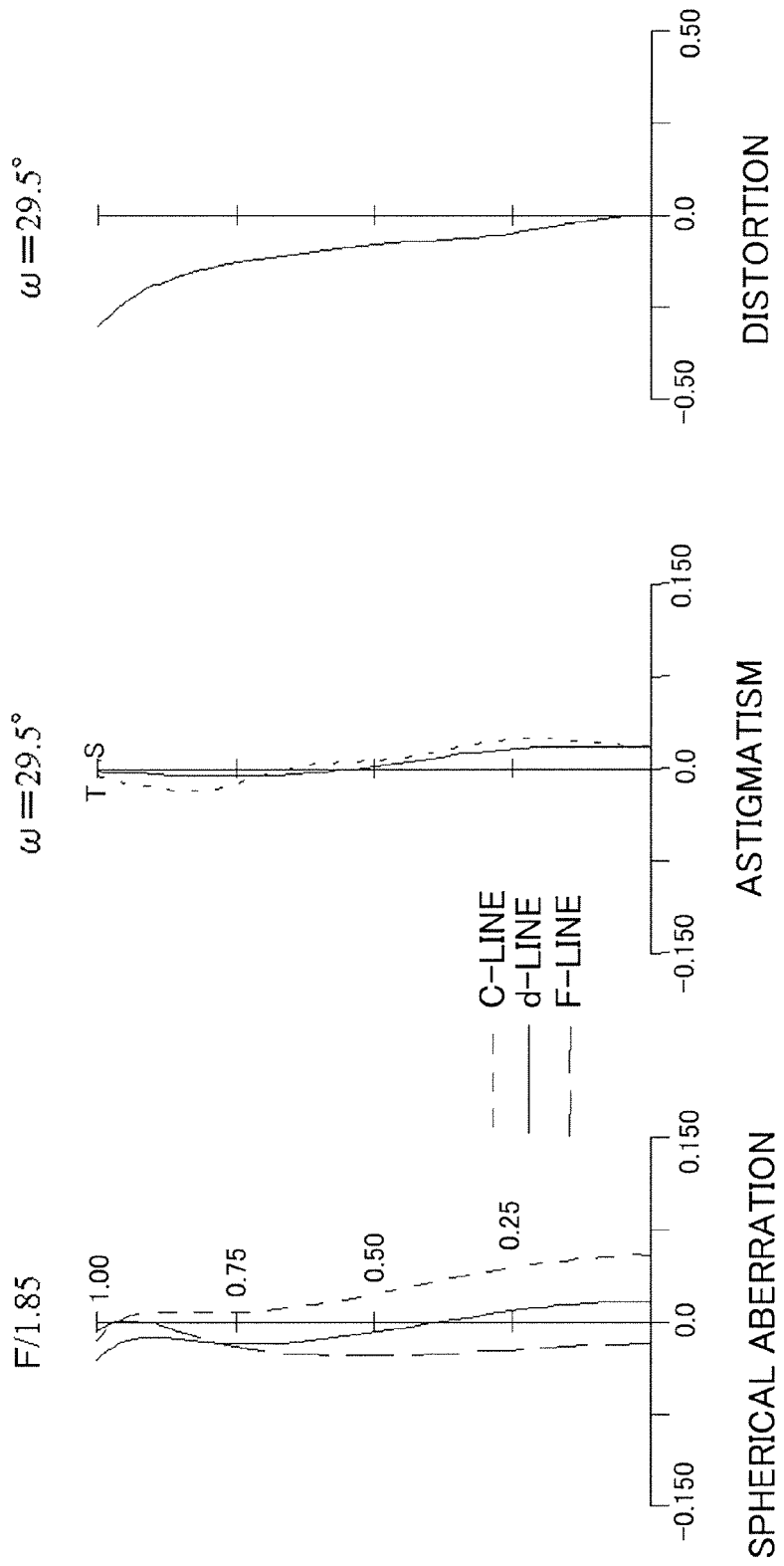
FIG. 5 shows aberrations of the zoom lens of Embodiment 2 (numerical example) at the wide-angle end.
Figure 6:
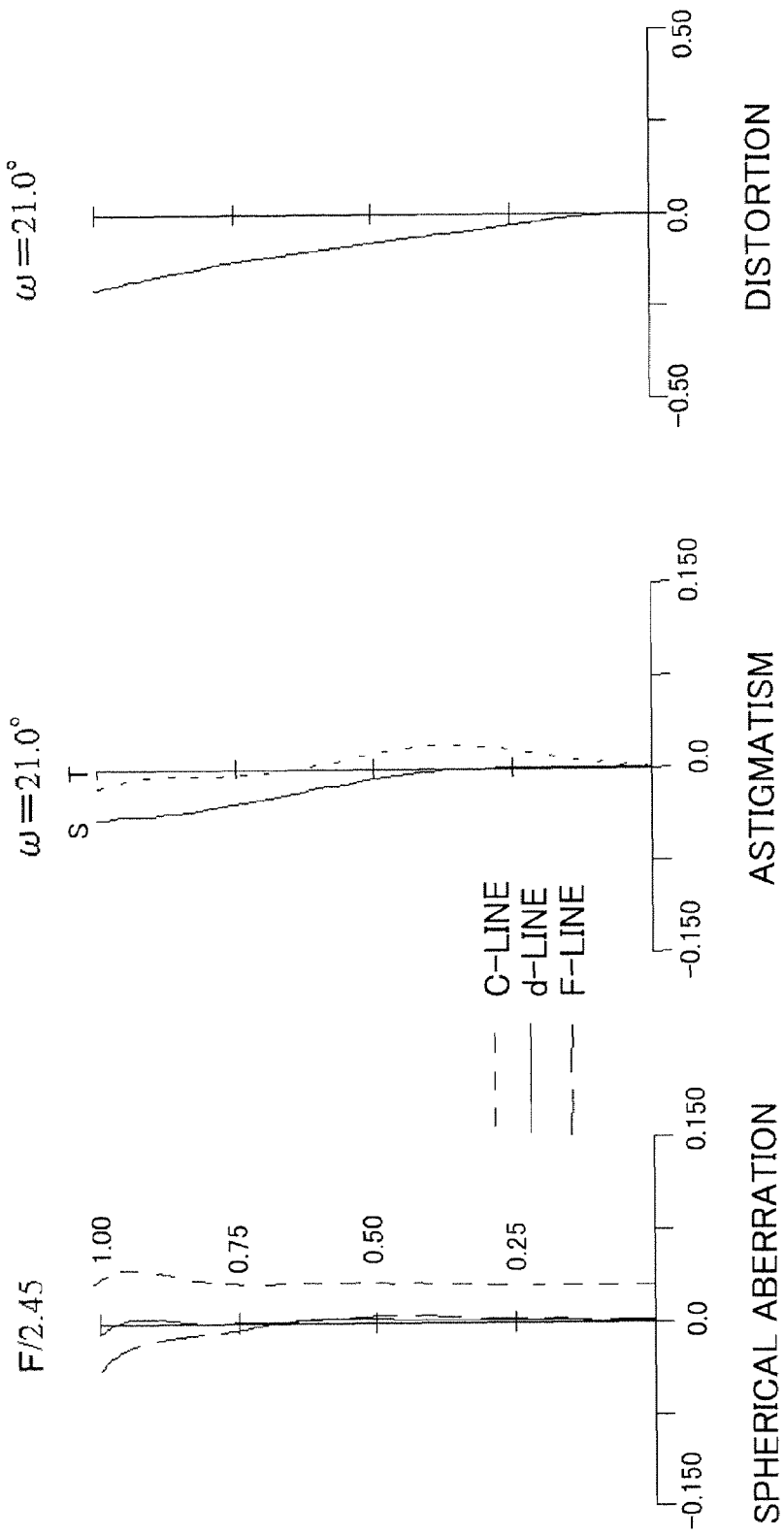
FIG. 6 shows aberrations of the zoom lens of Embodiment 2 (numerical example) at a telephoto end.

Table 2 shows a numerical example of this embodiment. FIGS. 5 and 6 respectively show aberrations of the zoom lens in this numerical example at the wide-angle end and at the telephoto end, the projection distance being 2.1 m.

TABLE 2 f = 21.83-31.98 ω = 29.5°-21.0° F/1.85-F/2.63
$f_{1B}/f_1 = -5.06$
SF = −8.982
$f_{1A}/f_{1B} = -0.140$
$|f_w/bf| = 0.48$

|  | r | d | $n_d$ | $v_d$ |
|---|---|---|---|---|
| OBJ | 0.000 | 2100.00z | | |
| 1 | 32.398 | 3.00 | 1.805 | 25.4 |
| 2 | 20.568 | 7.43 | | |
| 3* | 182.576 | 3.60 | 1.529 | 55.8 |
| 4* | 31.944 | 11.17 | | |
| 5 | −23.895 | 2.00 | 1.487 | 70.2 |
| 6 | −88.669 | 3.90z | | |
| 7 | −38.717 | 4.03 | 1.834 | 37.1 |
| 8 | −30.960 | 12.88z | | |
| 9 | 116.756 | 3.90 | 1.834 | 37.1 |
| 10 | −184.486 | 37.00z | | |
| 11 | 42.683 | 4.65 | 1.567 | 42.8 |
| 12 | −2453.112 | 18.79z | | |
| 13* | −158.031 | 2.53 | 1.583 | 59.3 |
| 14* | −62.096 | 1.44 | | |
| 15 | 0.000 | 1.92z | | |
| 16 | −66.083 | 1.10 | 1.834 | 37.1 |
| 17 | 24.330 | 6.70 | 1.487 | 70.2 |
| 18 | −25.658 | 1.71 | | |
| 19 | −20.756 | 1.40 | 1.806 | 33.2 |
| 20 | 74.326 | 6.24 | 1.487 | 70.2 |
| 21 | −34.883 | 0.50 | | |
| 22 | 161.145 | 9.18 | 1.496 | 81.5 |
| 23 | −27.972 | 0.78z | | |
| 24 | 75.477 | 4.14 | 1.805 | 25.4 |
| 25 | −1016.390 | 1.50 | | |
| 26 | 0.000 | 32.76 | 1.516 | 64.1 |
| 27 | 0.000 | 5.00 | | |
| 28 | 0.000 | 21.00 | 1.672 | 32.2 |
| 29 | 0.000 | | | |
| IMG | 0.000 | | | |

|  | K | A | B | C | D | E |
|---|---|---|---|---|---|---|
| 3 | 0.000e+000 | 3.603e−005 | −1.196e−007 | 3.811e−010 | −6.816e−013 | 5.882e−016 |
| 4 | −3.210e−001 | 3.171e−005 | −1.320e−007 | 3.605e−010 | −5.625e−013 | 1.194e−016 |
| 13 | 0.000e+000 | −4.233e−006 | 4.570e−009 | 2.119e−011 | 1.685e−013 | 1.603e−016 |
| 14 | 0.000e+000 | −1.962e−006 | 8.354e−009 | −3.922e−012 | 3.910e−013 | −4.491e−016 |

|  | W | M | T |
|---|---|---|---|
| d6 | 3.90 | 3.90 | 3.90 |
| d9 | 12.88 | 5.12 | 1.37 |
| d10 | 37.00 | 32.70 | 19.04 |
| d12 | 18.79 | 16.74 | 19.89 |
| d15 | 1.92 | 7.99 | 10.16 |
| d23 | 0.78 | 8.81 | 20.90 |

|  | W close | W ∞ | T close | T ∞ |
|---|---|---|---|---|
| d0 | 1200.00 | 9000.00 | 1200.00 | 9000.00 |
| d6 | 4.21 | 3.59 | 4.21 | 3.59 |
| d8 | 12.58 | 13.19 | 1.07 | 1.68 |

Embodiment 3

Figure 7:
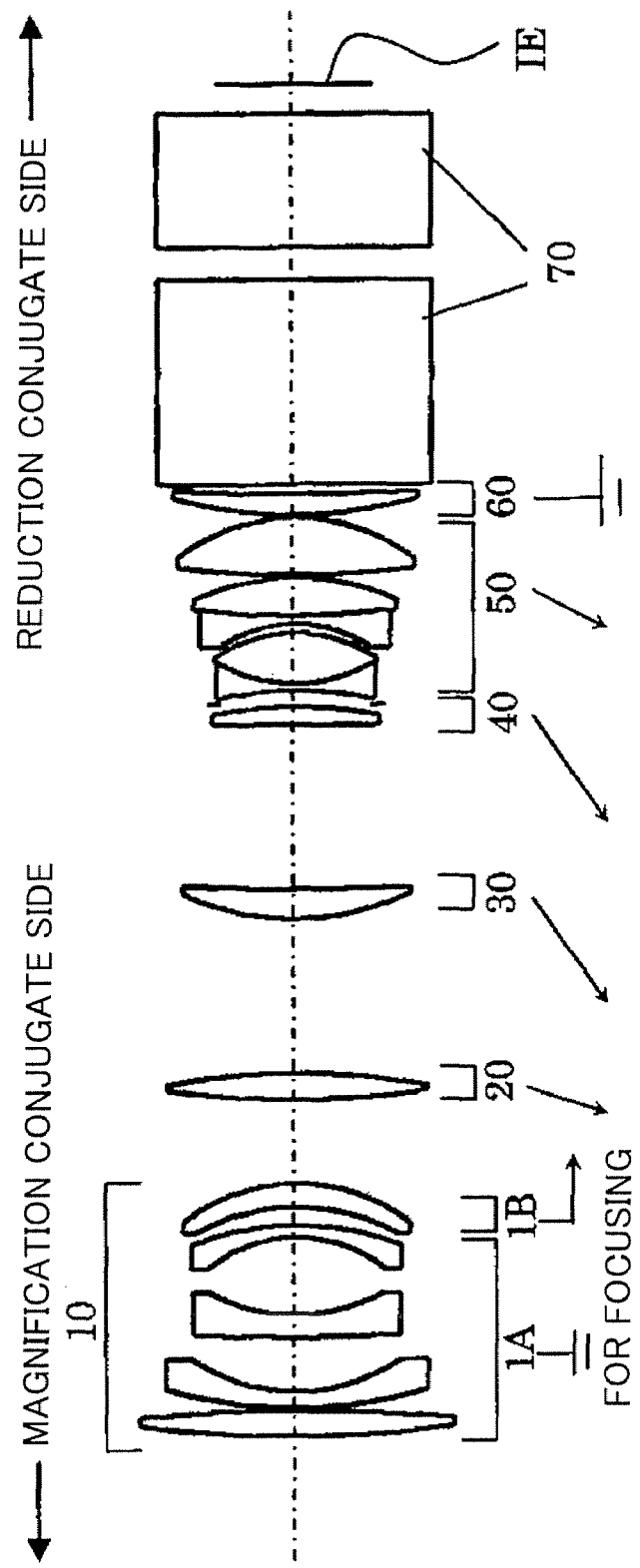
FIG. 7 is a sectional view showing a zoom lens that is a third embodiment (Embodiment 3) of the present invention at a wide-angle end.

FIG. 7 shows an optical section of a zoom lens (projection lens) that is a third embodiment (Embodiment 3) of the present invention at a wide-angle end.

The lens configuration and a focusing method of this embodiment are basically identical to those in Embodiment 1. However, the zoom lens uses a lens unit having a positive refractive power for the first lens unit 10 and a so-called replica aspheric surface formed of a resin material for the magnification conjugate side surface of the second lens unit 20.

A lens element having a positive refractive power is provided in the first-A lens sub-unit, which reduces the ratio of the refractive power of the first-B lens sub-unit to that of the entire first lens unit compared to the ratio in Embodiment 2.

Figure 8:
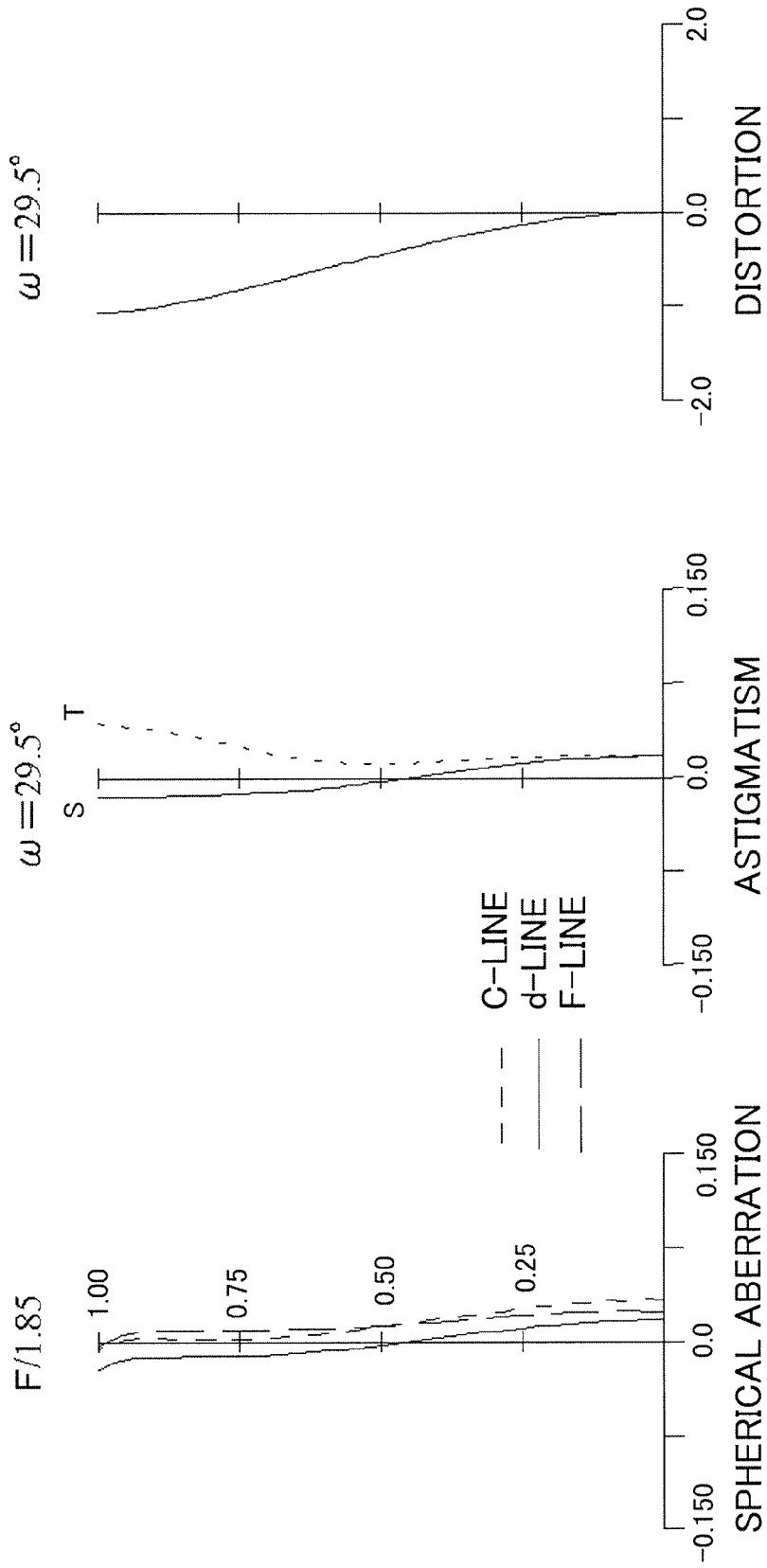
FIG. 8 shows aberrations of the zoom lens of Embodiment 3 (numerical example) at the wide-angle end.
Figure 9:
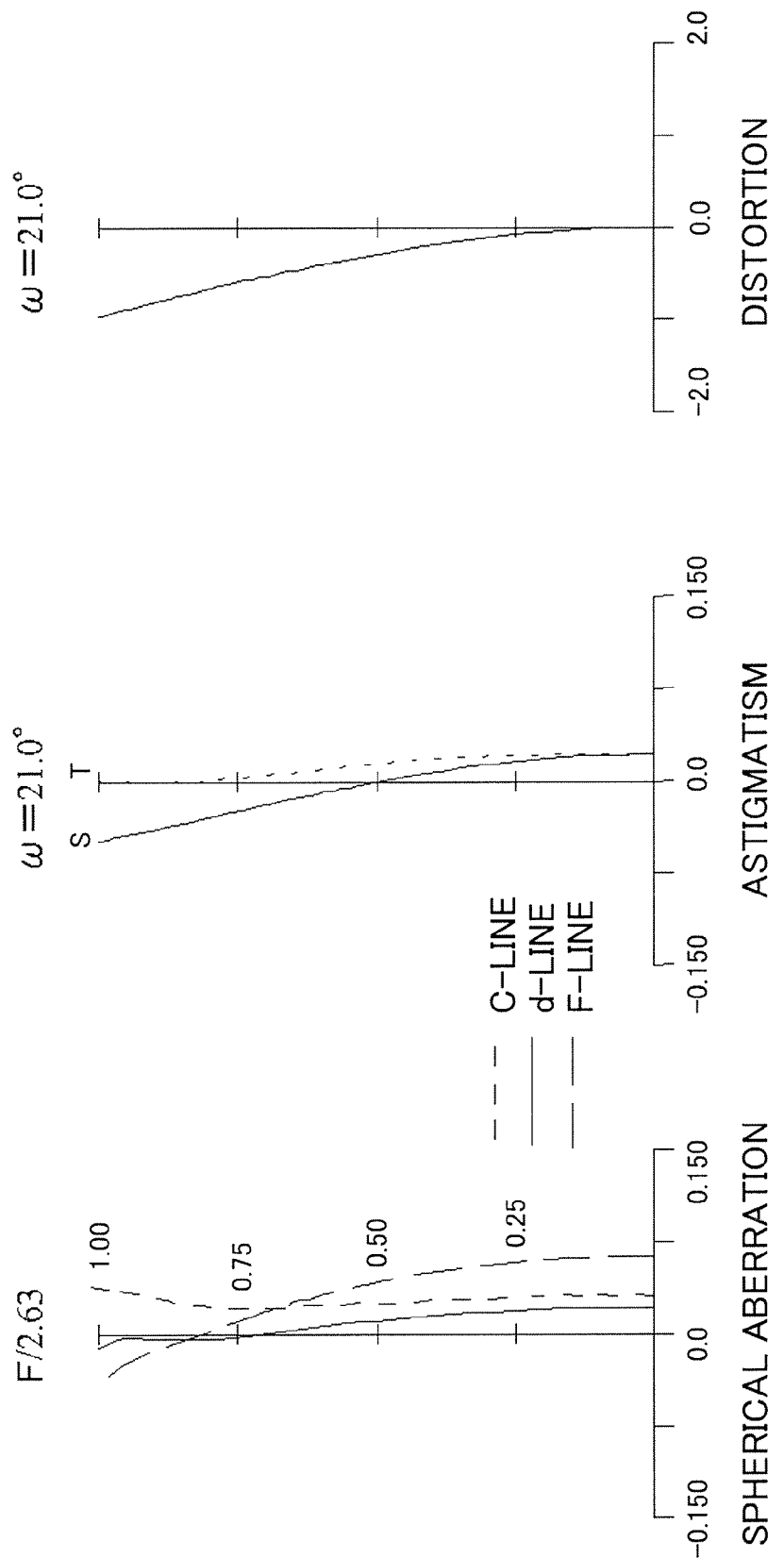
FIG. 9 shows aberrations of the zoom lens of Embodiment 3 (numerical example) at a telephoto end.

Table 3 shows a numerical example of this embodiment. FIGS. 8 and 9 respectively show aberrations of the zoom lens in this numerical example at the wide-angle end and at the telephoto end, the projection distance being 2.1 m.

TABLE 3

$f = 21.83\text{-}31.98 \ \omega = 29.5°\text{-}21.0° \ F/1.85\text{-}F/2.63$
$f_{1B}/f_1 = -7.97$
$SF = -14.7534$
$f_{1A}/f_{1B} = -0.096$
$|f_w/bf| = 0.48$

|   | r | d | $n_d$ | $v_d$ |
|---|---|---|---|---|
| OBJ | 0.000 | 2100.00z |  |  |
| 1 | 186.158 | 4.09 | 1.487 | 70.2 |
| 2 | −245.483 | 0.40 |  |  |
| 3* | 76.847 | 0.05 | 1.579 | 39.9 |
| 4 | 69.745 | 2.60 | 1.806 | 33.2 |
| 5 | 28.632 | 8.71 |  |  |
| 6 | 350.000 | 3.60 | 1.696 | 55.5 |
| 7 | 29.071 | 12.27 |  |  |
| 8 | −21.765 | 2.00 | 1.487 | 70.2 |
| 9 | −43.671 | 2.80z |  |  |
| 10 | −32.725 | 3.78 | 1.806 | 40.9 |
| 11 | −28.570 | 13.44z |  |  |
| 12 | 137.206 | 4.23 | 1.834 | 37.1 |
| 13 | −109.678 | 24.48z |  |  |
| 14 | 40.509 | 4.75 | 1.487 | 70.2 |
| 15 | 328.101 | 26.29z |  |  |
| 16* | 756.599 | 2.71 | 1.583 | 59.3 |
| 17* | −73.676 | 0.50 |  |  |
| 18 | 0.000 | 2.22z |  |  |
| 19 | −53.227 | 1.10 | 1.834 | 37.1 |
| 20 | 24.281 | 7.94 | 1.496 | 81.5 |
| 21 | −22.813 | 1.46 |  |  |
| 22 | −20.629 | 1.40 | 1.834 | 37.1 |
| 23 | 121.915 | 5.92 | 1.622 | 58.1 |
| 24 | −37.914 | 0.50 |  |  |
| 25 | 142.258 | 8.96 | 1.487 | 70.2 |
| 26 | −29.952 | 0.50z |  |  |
| 27 | 69.883 | 3.30 | 1.805 | 25.4 |
| 28 | 358.487 | 1.50 |  |  |
| 29 | 0.000 | 32.76 | 1.516 | 64.1 |
| 30 | 0.000 | 5.00 |  |  |
| 31 | 0.000 | 21.00 | 1.672 | 32.2 |
| 32 | 0.000 |  |  |  |
| IMG | 0.000 |  |  |  |

|    | K | A | B | C | D | E |
|----|---|---|---|---|---|---|
| 3  | 0.000e+000 | 2.283e−006 | −1.004e−009 | −1.424e−012 | 3.264e−015 | −3.502e−018 |
| 16 | 0.000e+000 | −4.623e−006 | 5.451e−009 | −1.677e−010 | 1.215e−012 | −2.802e−015 |
| 17 | 0.000e+000 | −2.353e−006 | 8.993e−009 | −1.912e−010 | 1.450e−012 | −3.511e−015 |

|     | W | M | T |
|-----|---|---|---|
| d9  | 2.80 | 2.80 | 2.80 |
| d11 | 13.44 | 4.62 | 1.41 |
| d13 | 24.48 | 22.52 | 9.73 |
| d15 | 26.29 | 21.23 | 24.44 |
| d18 | 2.22 | 11.90 | 14.77 |
| d26 | 0.50 | 6.66 | 16.58 |

|     | W close | W ∞ | T close | T ∞ |
|-----|---------|-----|---------|-----|
| d0  | 1200.00 | 9000.00 | 1200.00 | 9000.00 |
| d9  | 3.16 | 2.46 | 3.16 | 2.46 |
| d11 | 13.03 | 13.80 | 1.00 | 1.77 |
| d13 | 24.48 | 24.48 | 9.73 | 9.73 |

Embodiment 4

Figure 10:
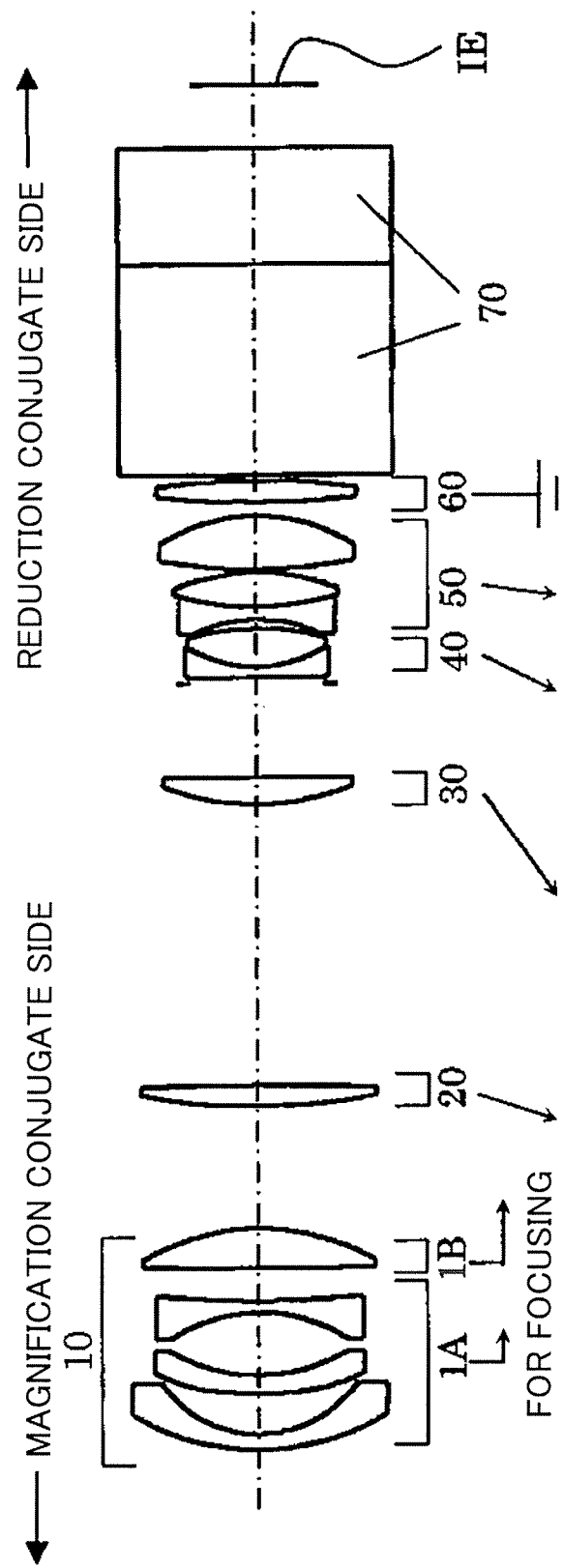
FIG. 10 is a sectional view showing a zoom lens that is a fourth embodiment (Embodiment 4) of the present invention at a wide-angle end.

FIG. 10 shows an optical section of a zoom lens (projection lens) that is a fourth embodiment (Embodiment 4) of the present invention at a wide-angle end.

The zoom lens of this embodiment is constituted by six lens units 10, 20, 30, 40, 50, and 60 including twelve lens elements. The six lens units 10 to 60 have, in order from the magnification conjugate side, negative, positive, positive, negative, positive, and positive refractive powers. A second lens element in the twelve lens elements, which is counted from the magnification conjugate side, has aspheric surfaces on its both sides.

For zooming, the second, third, fourth, and fifth lens units 20 to 50 are moved, and the first and sixth lens units 10 and 60 are fixed (unmoved). In other words, the first and sixth lens units 10 and 60 do not contribute to zooming, and the second, third, fourth, and fifth lens units 20 to 50 are magnification-varying lens units.

In the first lens unit 10, for focusing from the infinite side (far side) to the close side (near side), a first-A lens sub-unit and a first-B lens sub-unit are both moved toward the reduction conjugate side as a distance therebetween is increased.

Figure 11:
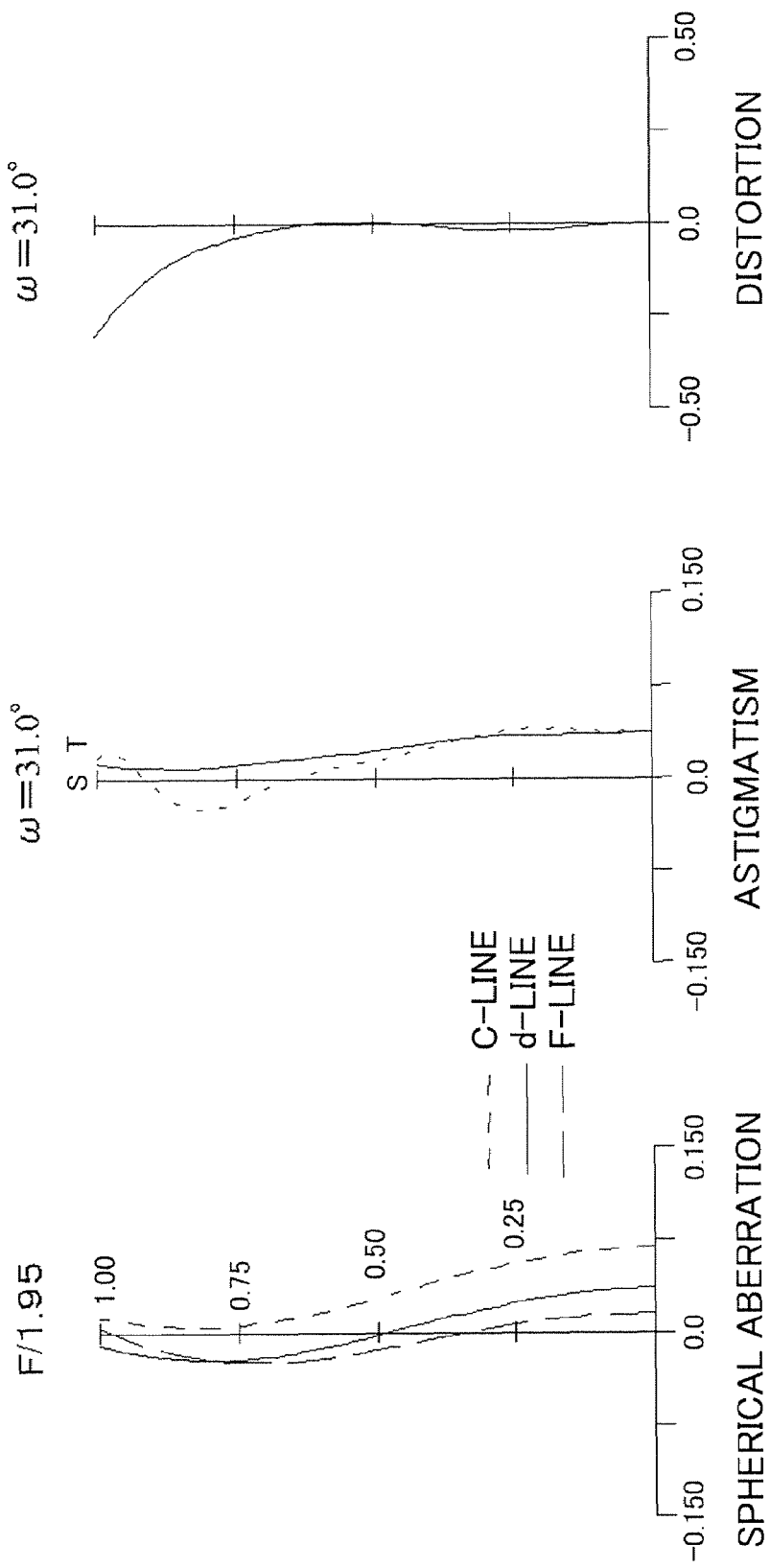
FIG. 11 shows aberrations of the zoom lens of Embodiment 4 (numerical example) at the wide-angle end.
Figure 12:
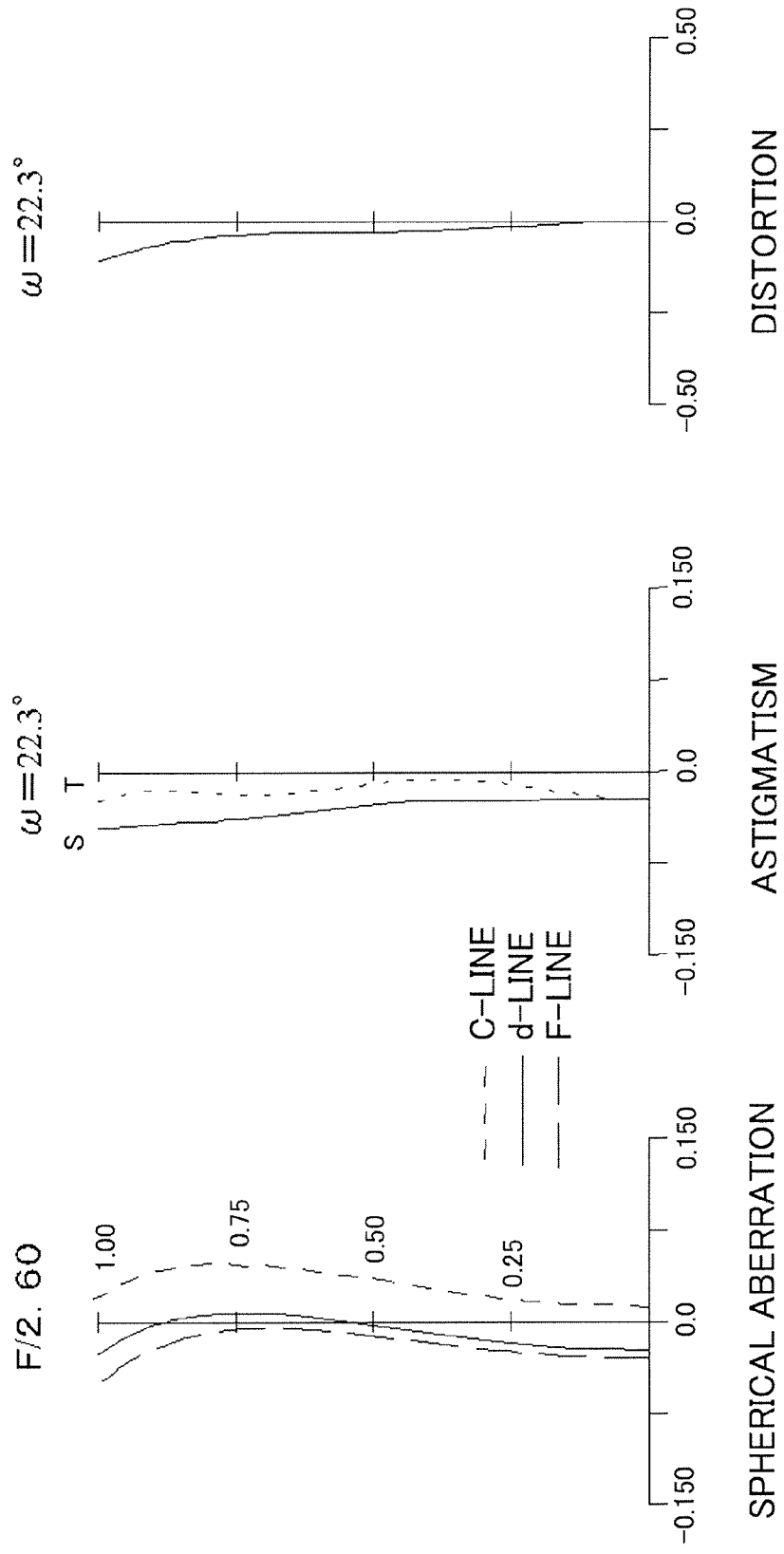
FIG. 12 shows aberrations of the zoom lens of Embodiment 4 (numerical example) at a telephoto end.

Table 4 shows a numerical example of this embodiment. FIGS. 11 and 12 respectively show aberrations of the zoom lens in this numerical example at the wide-angle end and at the telephoto end, the projection distance being 2.1 m.

TABLE 4

$f = 16.74\text{-}24.53 \quad \omega = 31.0°\text{-}22.3° \quad F/1.95\text{-}F/2.60$
$f_{1B}/f_1 = -1.812$
$SF = -0.880$
$f_{1A}/f_{1B} = -0.252$
$|f_w/bf| = 0.39$

| | r | d | $n_d$ | $\nu_d$ |
|---|---|---|---|---|
| OBJ | 0.000 | 2100.00z | | |
| 1 | 38.216 | 2.50 | 1.749 | 35.2 |
| 2 | 18.693 | 6.47 | | |
| 3* | 100.000 | 2.88 | 1.529 | 55.7 |
| 4* | 30.723 | 9.72 | | |
| 5 | −26.038 | 1.80 | 1.603 | 60.6 |
| 6 | 159.909 | 5.06z | | |
| 7 | 551.098 | 6.38 | 1.603 | 38.0 |
| 8 | −35.233 | 19.05z | | |
| 9 | 97.824 | 3.37 | 1.834 | 37.1 |
| 10 | −495.963 | 44.29z | | |
| 11 | 39.781 | 4.25 | 1.516 | 64.1 |
| 12 | −8480.044 | 14.85 | | |
| 13 | 0.000 | 0.87z | | |
| 14 | 290.288 | 1.80 | 1.834 | 37.1 |
| 15 | 20.719 | 5.97 | 1.487 | 70.2 |
| 16 | −39.876 | 1.43z | | |
| 17 | −22.238 | 2.06 | 1.834 | 37.1 |
| 18 | 45.751 | 5.40 | 1.487 | 70.2 |
| 19 | −33.070 | 0.50 | | |
| 20 | 83.020 | 8.41 | 1.487 | 70.2 |
| 21 | −27.762 | 2.08z | | |
| 22 | 145.159 | 3.35 | 1.784 | 25.6 |
| 23 | −124.900 | 1.00 | | |
| 24 | 0.000 | 33.44 | 1.516 | 64.1 |
| 25 | 0.000 | 18.00 | 1.805 | 25.4 |
| 26 | 0.000 | | | |
| IMG | 0.000 | | | |

| | K | A | B | C | D | E |
|---|---|---|---|---|---|---|
| 3 | 0.000e+000 | 5.546e−005 | −2.429e−007 | 8.648e−010 | −1.629e−012 | 1.095e−015 |
| 4 | 0.000e+000 | 4.557e−005 | −2.782e−007 | 8.090e−010 | −1.241e−012 | −6.886e−016 |

| | W | M | T |
|---|---|---|---|
| d6 | 5.06 | 5.06 | 5.06 |
| d8 | 19.05 | 8.42 | 1.43 |
| d10 | 44.29 | 40.17 | 31.43 |
| d13 | 0.87 | 5.75 | 11.09 |
| d16 | 1.43 | 3.75 | 4.33 |
| d21 | 2.08 | 9.64 | 19.45 |

| | W close | W ∞ | T close | T ∞ |
|---|---|---|---|---|
| d0 | 1200.00 | 9000.00 | 1200.00 | 9000.00 |
| d6 | 5.26 | 4.81 | 5.26 | 4.81 |
| d8 | 18.38 | 19.90 | 0.75 | 2.28 |

Embodiment 5

Figure 13:
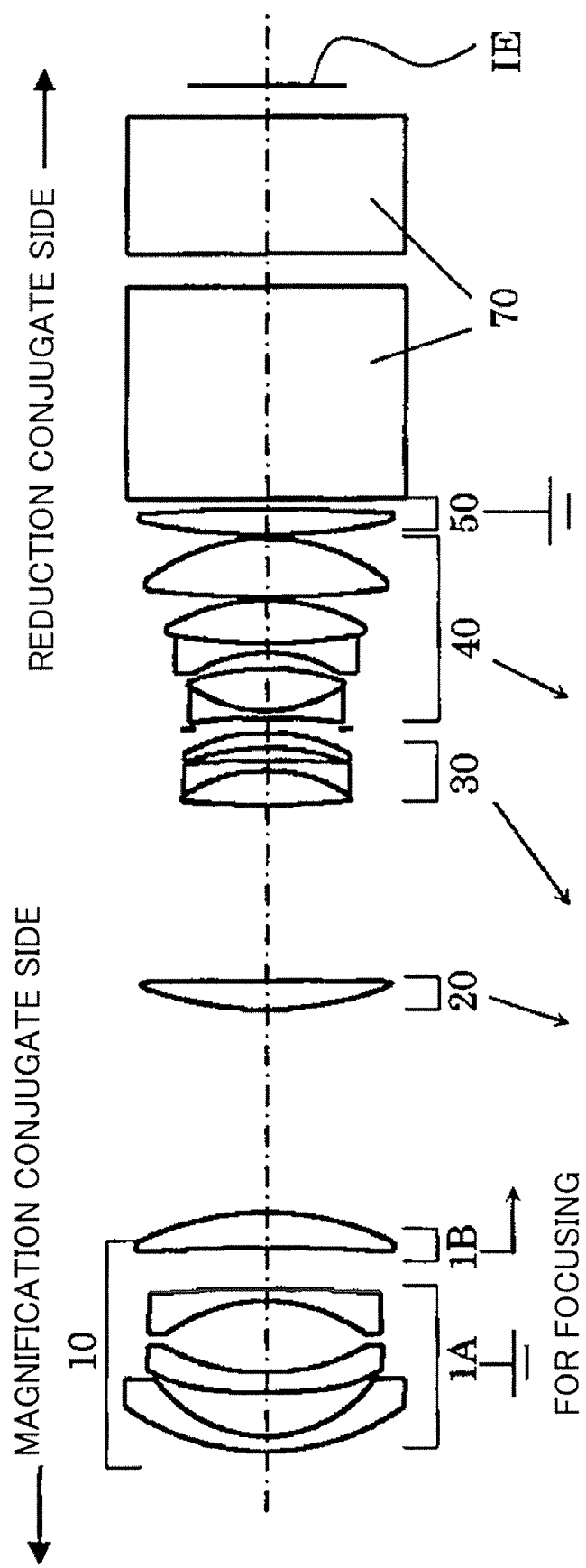
FIG. 13 is a sectional view showing a zoom lens that is a fifth embodiment (Embodiment 5) of the present invention at a wide-angle end.

FIG. 13 shows an optical section of a zoom lens (projection lens) that is a fifth embodiment (Embodiment 5) of the present invention at a wide-angle end.

The zoom lens of this embodiment is constituted by five lens units 10, 20, 30, 40, and 50 including fifteen lens elements. The five lens units 10 to 50 have, in order from the magnification conjugate side, negative, positive, positive, positive, and positive refractive powers. A second lens element in the fifteen lens elements, which is counted from the magnification conjugate side, has aspheric surfaces on its both sides.

For zooming, the second, third, and fourth lens units 20 to 40 are moved, and the first and fifth lens units 10 and 50 are fixed (unmoved). In other words, the first and fifth lens units 10 and 50 do not contribute to zooming, and the second, third, and fourth lens units 20 to 40 are magnification-varying lens units.

In the first lens unit 10, a first-A lens sub-unit is fixed in focusing. In other words, only a first-B lens sub-unit is moved for focusing.

Figure 14:
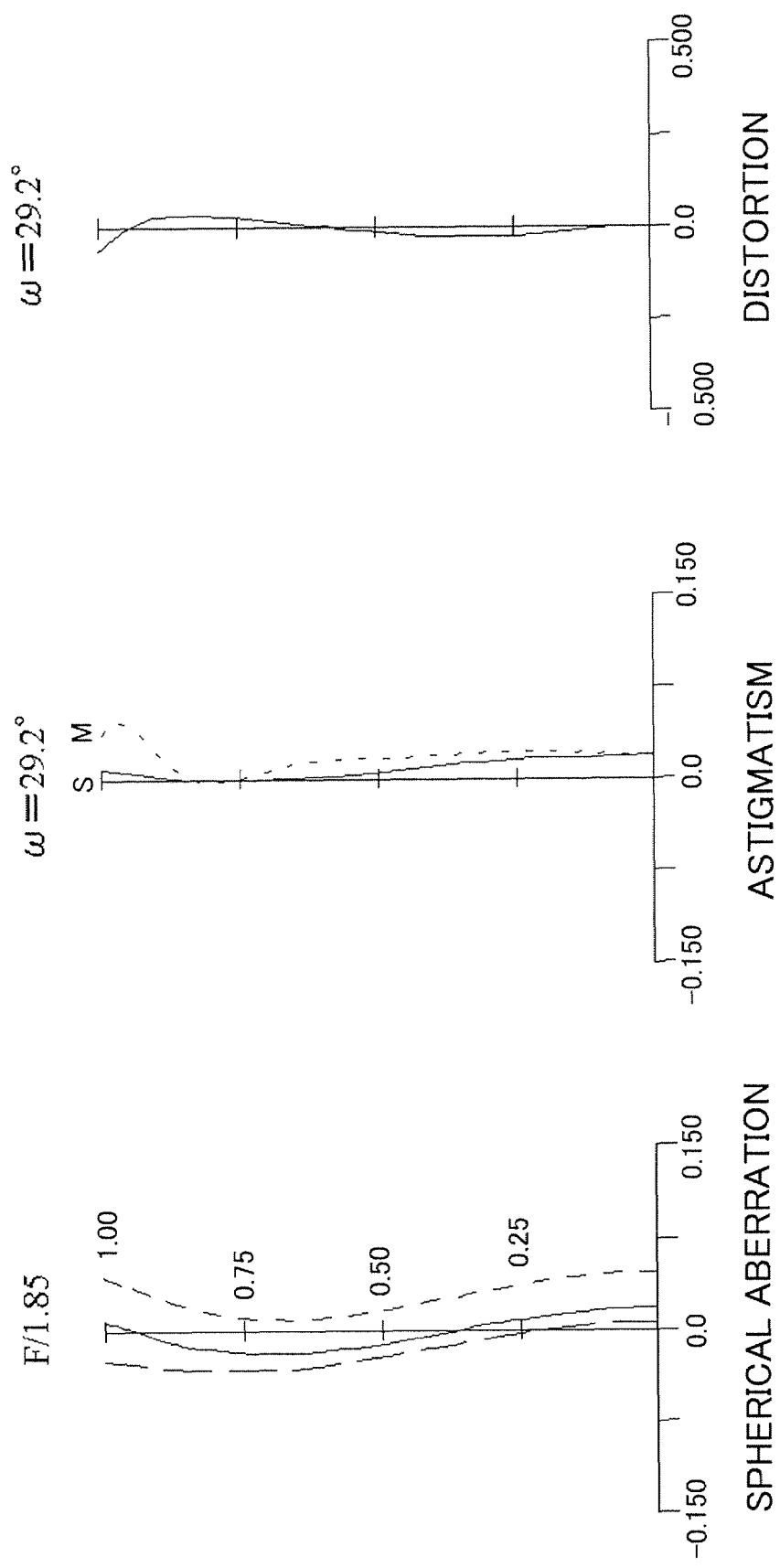
FIG. 14 shows aberrations of the zoom lens of Embodiment 5 (numerical example) at the wide-angle end.
Figure 15:
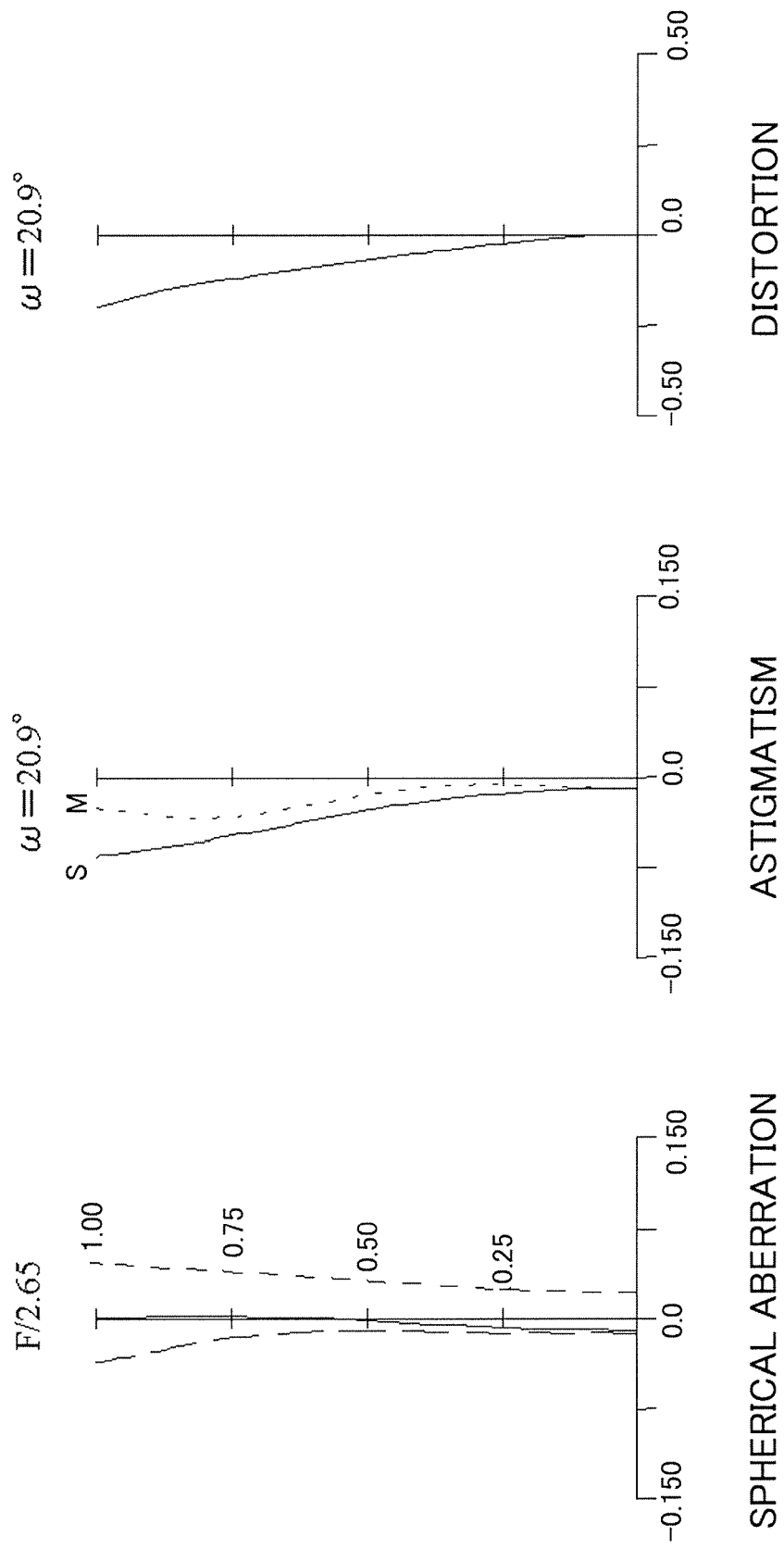
FIG. 15 shows aberrations of the zoom lens of Embodiment 5 (numerical example) at a telephoto end.

Table 5 shows a numerical example of this embodiment. FIGS. 14 and 15 respectively show aberrations of the zoom lens in this numerical example at the wide-angle end and at the telephoto end, the projection distance being 2.1 m.

TABLE 5

$f = 21.8\text{-}32.0 \ \omega = 29.2°\text{-}20.9° \ F/1.85\text{-}F/2.65$
$f_{1B}/f_1 = -1.33$
$SF = -1.3$
$f_{1A}/f_{1B} = -0.300$
$|f_w/bf| = 0.48$

|     | r         | d        | $n_d$ | $v_d$ |
|-----|-----------|----------|-------|-------|
| OBJ | 0.000     | 2100.00z |       |       |
| 1   | 35.847    | 2.32     | 1.805 | 25.4  |
| 2   | 20.530    | 7.06     |       |       |
| 3*  | 283.819   | 3.16     | 1.529 | 55.8  |
| 4*  | 41.975    | 10.93    |       |       |
| 5   | −25.721   | 1.99     | 1.487 | 70.2  |
| 6   | −365.063  | 6.67z    |       |       |
| 7   | −356.435  | 5.46     | 1.834 | 37.1  |
| 8   | −46.567   | 30.33z   |       |       |
| 9   | 53.451    | 4.30     | 1.834 | 37.1  |
| 10  | −1350.928 | 27.87z   |       |       |
| 11  | 124.166   | 5.08     | 1.487 | 70.2  |
| 12  | −23.860   | 1.50     | 1.772 | 49.5  |
| 13  | −196.907  | 2.03     |       |       |
| 14  | −37.103   | 2.23     | 1.772 | 49.5  |
| 15  | −27.752   | 0.50     |       |       |
| 16  | 0.000     | 1.70z    |       |       |
| 17  | −84.481   | 1.10     | 1.698 | 30.1  |
| 18  | 21.035    | 6.42     | 1.487 | 70.2  |
| 19  | −36.463   | 2.44     |       |       |
| 20  | −21.176   | 1.40     | 1.834 | 37.1  |
| 21  | 99.485    | 6.47     | 1.487 | 70.2  |
| 22  | −30.133   | 0.71     |       |       |
| 23  | 163.023   | 8.81     | 1.496 | 81.5  |
| 24  | −29.998   | 0.50z    |       |       |
| 25  | 83.700    | 4.02     | 1.805 | 25.4  |
| 26  | −278.349  | 1.50     |       |       |
| 27  | 0.000     | 32.76    | 1.516 | 64.1  |
| 28  | 0.000     | 5.00     |       |       |
| 29  | 0.000     | 21.00    | 1.672 | 32.2  |
| 30  | 0.000     |          |       |       |
| IMG | 0.000     |          |       |       |

|     | W     | M     | T     |
|-----|-------|-------|-------|
| d6  | 6.67  | 6.67  | 6.67  |
| d8  | 30.33 | 12.57 | 4.00  |
| d10 | 27.87 | 24.05 | 17.53 |
| d16 | 1.70  | 10.81 | 20.29 |
| d24 | 0.50  | 12.98 | 18.58 |

|    | W close | W ∞     | T close | T ∞     |
|----|---------|---------|---------|---------|
| d0 | 1200.00 | 8700.00 | 1200.00 | 8700.00 |
| d6 | 6.90    | 6.42    | 6.90    | 6.42    |
| d8 | 29.66   | 31.06   | 3.32    | 4.73    |

|   | K         | A         | B          | C         | D          | E          |
|---|-----------|-----------|------------|-----------|------------|------------|
| 3 | 0.000e+000 | 4.927e−005 | −1.468e−007 | 3.810e−010 | −4.464e−013 | 1.105e−016 |
| 4 | 0.000e+000 | 4.362e−005 | −1.440e−007 | 2.205e−010 | 2.380e−013  | −1.353e−015 |

Embodiment 6

Figure 16:
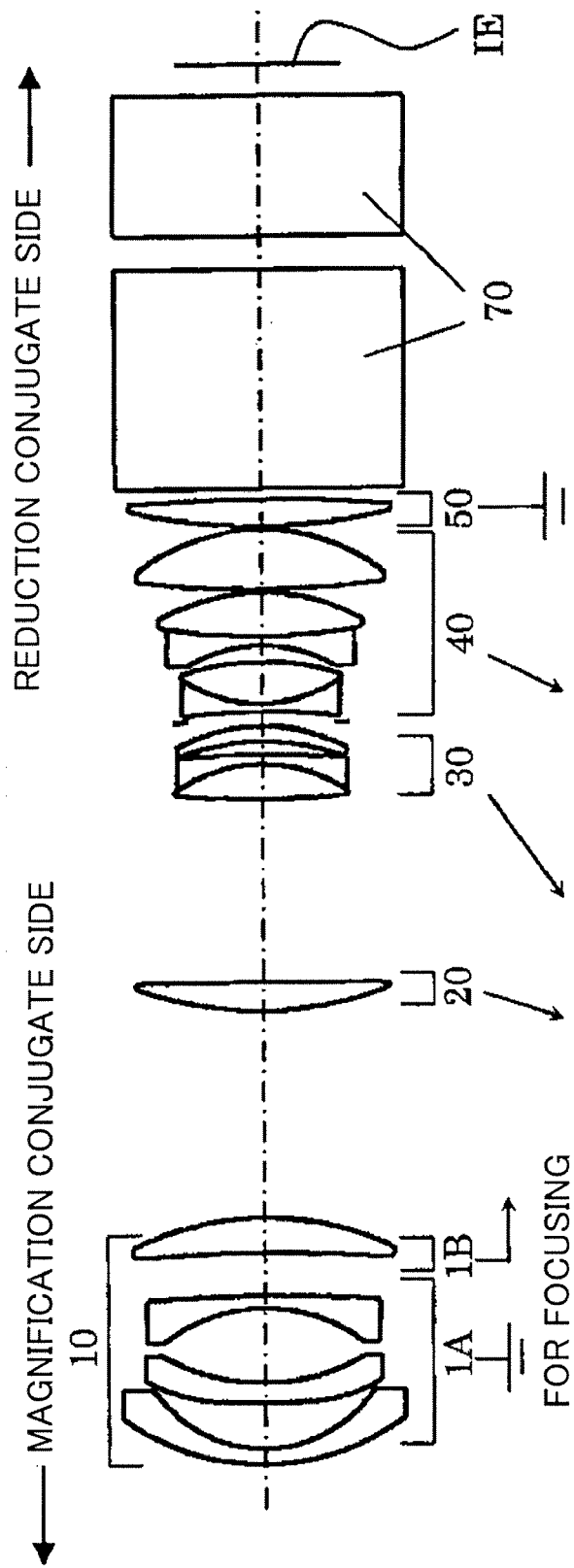
FIG. 16 is a sectional view showing a zoom lens that is a sixth embodiment (Embodiment 6) of the present invention at a wide-angle end.

FIG. 16 shows an optical section of a zoom lens (projection lens) that is a sixth embodiment (Embodiment 6) of the present invention at a wide-angle end.

The zoom lens of this embodiment is constituted by five lens units 10, 20, 30, 40, and 50 including fifteen lens elements. The five lens units 10 to 50 have, in order from the magnification conjugate side, negative, positive, positive, negative, and positive refractive powers. A second lens element in the fifteen lens elements, which is counted from the magnification conjugate side, has aspheric surfaces on its both sides.

For zooming, the second, third, and fourth lens units 20 to 40 are moved, and the first and fifth lens units 10 and 50 are fixed (unmoved). In other words, the first and fifth lens units 10 and 50 do not contribute to zooming, and the second, third, and fourth lens units 20 to 40 are magnification-varying lens units.

In the first lens unit 10, a first-A lens sub-unit is fixed in focusing. In other words, only a first-B lens sub-unit is moved for focusing.

Figure 17:
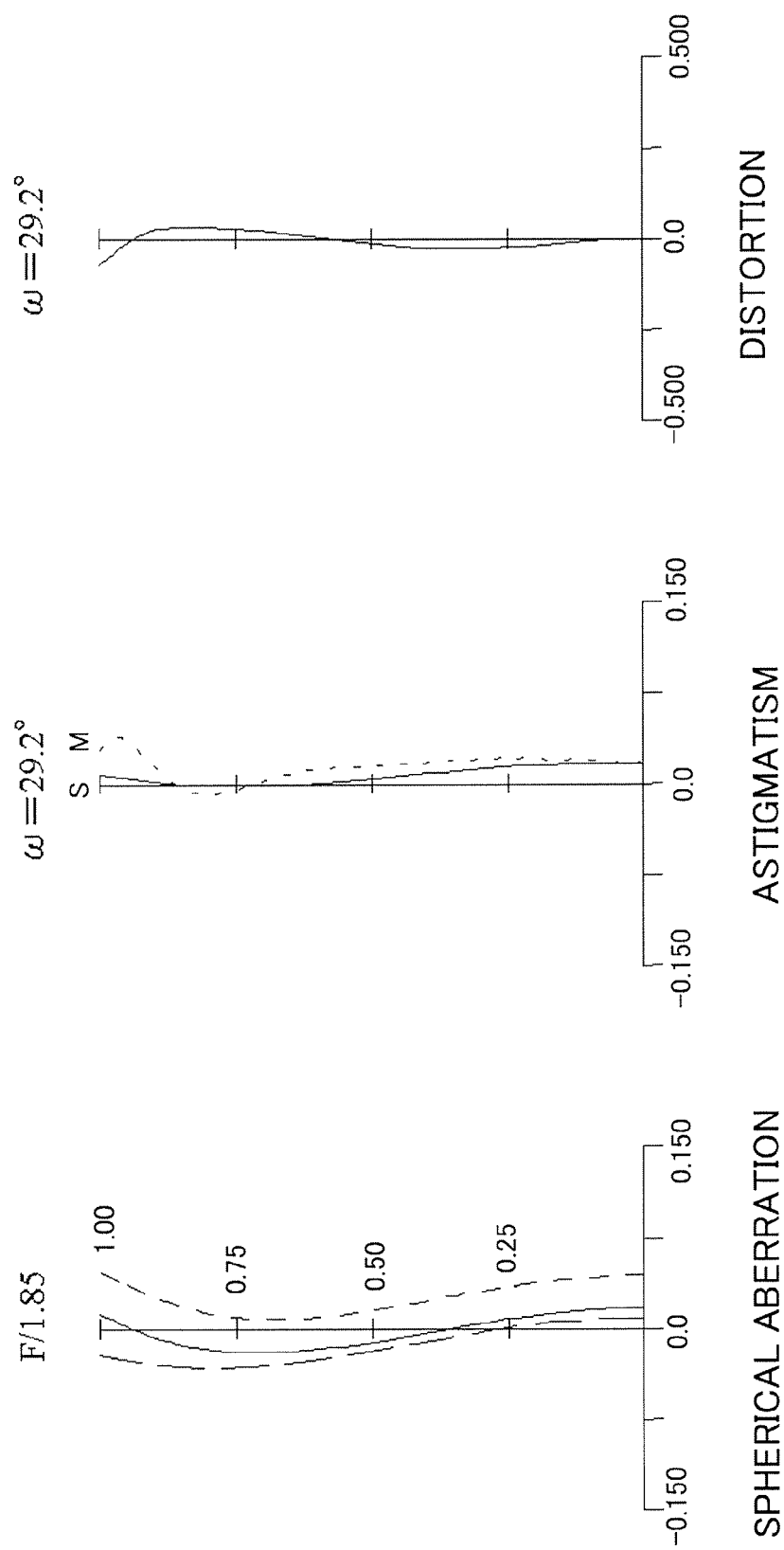
FIG. 17 shows aberrations of the zoom lens of Embodiment 6 (numerical example) at the wide-angle end.
Figure 18:
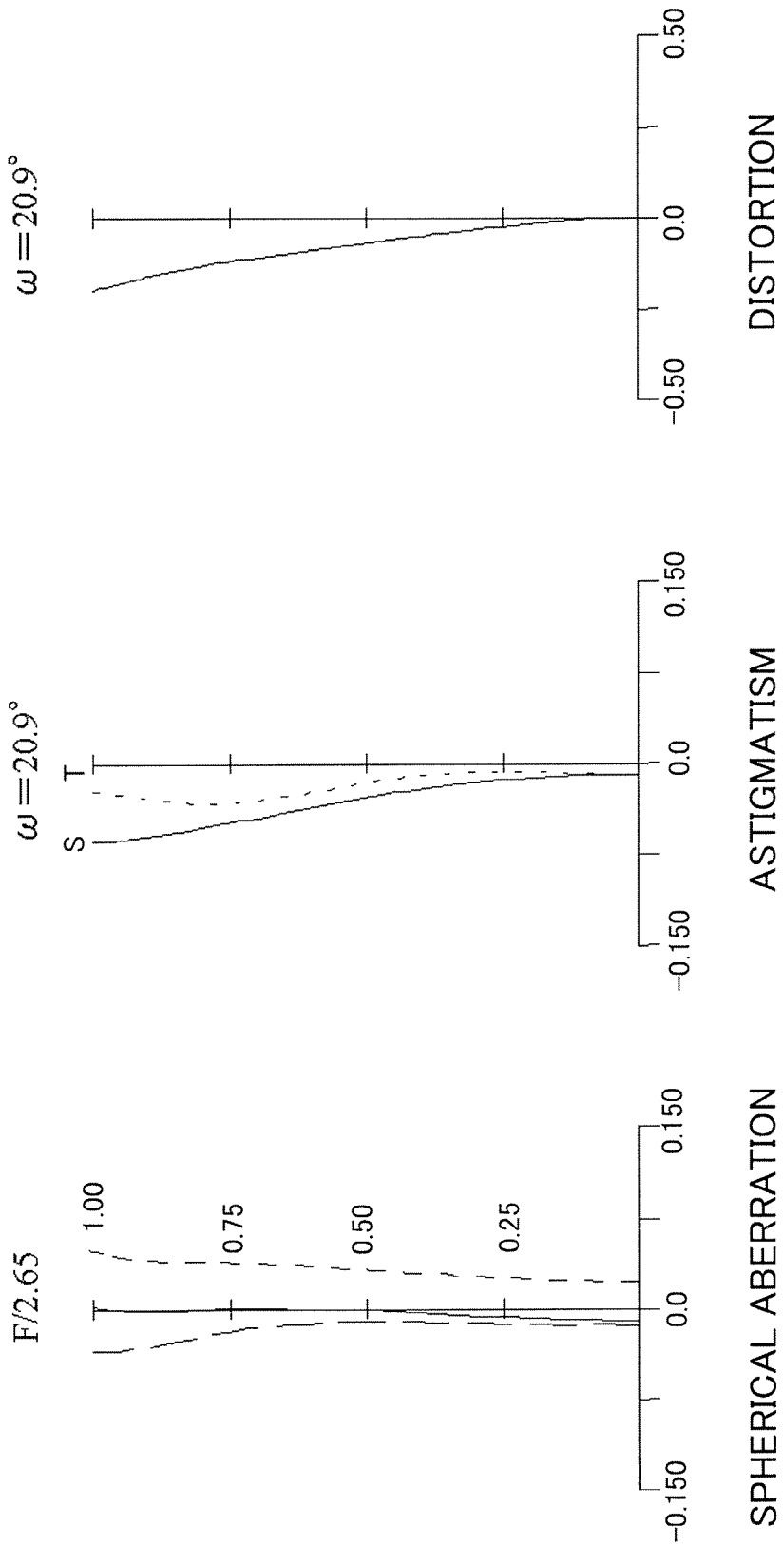
FIG. 18 shows aberrations of the zoom lens of Embodiment 6 (numerical example) at a telephoto end.

Table 6 shows a numerical example of this embodiment. FIGS. 17 and 18 respectively show aberrations of the zoom lens in this numerical example at the wide-angle end and at the telephoto end, the projection distance being 2.1 m.

TABLE 6

$f = 21.8\text{-}32.0 \ \omega = 29.2°\text{-}20.9°\ F/1.85\text{-}F/2.65$
$f_{1B}/f_1 = -1.332$
$SF = -1.437$
$f_{1A}/f_{1B} = -0.299$
$|f_w/bf| = 0.48$

|  | r | d | $n_d$ | $v_d$ |
|---|---|---|---|---|
| OBJ | 0.000 | 2100.00z | | |
| 1 | 36.246 | 2.32 | 1.805 | 25.4 |
| 2 | 20.318 | 6.78 | | |
| 3* | 259.970 | 3.08 | 1.529 | 55.8 |
| 4* | 42.461 | 10.99 | | |
| 5 | −24.883 | 1.90 | 1.487 | 70.2 |
| 6 | −233.601 | 6.40z | | |
| 7 | −245.883 | 5.29 | 1.834 | 37.1 |
| 8 | −44.059 | 31.35z | | |
| 9 | 52.835 | 4.39 | 1.834 | 37.1 |
| 10 | −1296.399 | 27.49z | | |
| 11 | 125.724 | 5.26 | 1.487 | 70.2 |
| 12 | −22.813 | 1.50 | 1.772 | 49.5 |
| 13 | −176.005 | 1.95 | | |
| 14 | −35.433 | 2.27 | 1.772 | 49.5 |
| 15 | −26.640 | 0.50 | | |
| 16 | 0.000 | 1.66z | | |
| 17 | −89.618 | 1.10 | 1.698 | 30.1 |
| 18 | 20.849 | 6.41 | 1.487 | 70.2 |
| 19 | −37.076 | 2.45 | | |
| 20 | −21.138 | 1.40 | 1.834 | 37.1 |
| 21 | 82.727 | 6.53 | 1.487 | 70.2 |
| 22 | −31.105 | 0.50 | | |
| 23 | 156.359 | 8.92 | 1.496 | 81.5 |
| 24 | −29.459 | 0.50z | | |
| 25 | 86.271 | 4.05 | 1.805 | 25.4 |
| 26 | −240.172 | 1.50 | | |
| 27 | 0.000 | 32.76 | 1.516 | 64.1 |
| 28 | 0.000 | 5.00 | | |
| 29 | 0.000 | 21.00 | 1.672 | 32.2 |
| 30 | 0.000 | | | |
| IMG | 0.000 | | | |

|  | W | M | T |
|---|---|---|---|
| d6 | 6.40 | 6.40 | 6.40 |
| d8 | 31.35 | 13.73 | 5.19 |
| d10 | 27.49 | 23.86 | 17.79 |
| d16 | 1.66 | 10.61 | 19.70 |
| d24 | 0.50 | 12.80 | 18.33 |

|  | W close | W ∞ | T close | T ∞ |
|---|---|---|---|---|
| d0 | 1200.00 | 8700.00 | 1200.00 | 8700.00 |
| d6 | 6.62 | 6.17 | 6.62 | 6.17 |
| d8 | 30.72 | 31.97 | 4.55 | 5.81 |

|  | K | A | B | C | D | E |
|---|---|---|---|---|---|---|
| 3 | 0.000e+000 | 4.890e−005 | −1.455e−007 | 3.812e−010 | −4.415e−013 | 8.228e−017 |
| 4 | 0.000e+000 | 4.265e−005 | −1.451e−007 | 2.300e−010 | 1.996e−013 | −1.361e−015 |

As described above, the zoom lens of each of the embodiments can correct well the variation of curvature of field due to the projection distance change in a wide projection distance range from a close distance to an infinite distance, thereby enabling the achievement of the zoom lens having a good optical performance.

Furthermore, the present invention is not limited to these embodiments and various variations and modifications may be made without departing from the scope of the present invention.

Although the description was made of the projection lens for the projector in the above embodiments, the zoom lens of an alternative embodiment of the present invention can be used as an image-taking lens for an image-pickup apparatus such as a video camera and a digital still camera.

This application claims the benefit of Japanese Patent Application No. 2007-100111, filed on Apr. 6, 2007, which is hereby incorporated by reference herein in its entirety.

What is claimed is:

1. A zoom lens that includes a plurality of lens units, comprising:
    a first lens unit that is disposed closest to a magnification side in the plurality of lens units and has a negative optical power; and
    a magnification-varying lens unit that is disposed closer to a reduction side than the first lens unit and moves for variation of magnification,
    wherein the first lens unit includes, in order from the magnification side, a first-A lens sub-unit having a negative optical power and a first-B lens subunit having a positive optical power, and
    wherein, for focusing from an infinite side to a close side, the first-A and first-B lens sub-units move as a distance therebetween increases, and the first-B lens sub-unit moves toward the reduction side.

2. A zoom lens according to claim 1, wherein a most-reduction side lens unit in the plurality of lens units has a positive optical power and is unmoved for focusing.

3. A zoom lens according to claim 1, wherein a most-reduction side lens surface of the first-B lens sub-unit is a convex surface toward the reduction side.

4. A zoom lens according to claim 3, wherein the first-B lens sub-unit is constituted by one meniscus lens element having a convex surface toward the reduction side.

5. A zoom lens according to claim 1, wherein the following condition is satisfied:

$$-30 < SF < -0.2$$

where $SF=(RR+RF)/(RR-RF)$ when RR and RF respectively represent curvature radii of a most-reduction side lens surface and a most-magnification side surface of the first-B lens sub-unit.

6. A zoom lens according to claim 1, wherein the following condition is satisfied:

$$-0.7 < f_{1A}/f_{1B} < -0.02$$

where $f_{1A}$ represents a focal length of the first-A lens sub-unit, and $f_{1B}$ represents a focal length of the first-B lens sub-unit.

7. A zoom lens according to claim 1, wherein the following condition is satisfied:

$$0.1 < |f_w/bf| < 0.8$$

where $f_w$ represents a focal length of the entire zoom lens at a wide-angle end, and bf represents a back focus in air from a most-reduction side lens surface in the zoom lens to a reduction side conjugate plane of the zoom lens.

8. An image projection apparatus comprising: an image-forming element that forms an image; and
    a zoom lens according to claim 1 that projects light from the image-forming element onto a projection surface.

* * * * *